(12) United States Patent
Asanuma

(10) Patent No.: US 12,142,179 B2
(45) Date of Patent: Nov. 12, 2024

(54) DISPLAY DEVICE, DISPLAY CONTROL METHOD, NON-TRANSITORY RECORDING MEDIUM, AND DISPLAY SYSTEM

(71) Applicant: Kohdai Asanuma, Kanagawa (JP)

(72) Inventor: Kohdai Asanuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/456,796

(22) Filed: Aug. 28, 2023

(65) Prior Publication Data

US 2024/0119880 A1  Apr. 11, 2024

(30) Foreign Application Priority Data

Sep. 29, 2022  (JP) ................................. 2022-156615

(51) Int. Cl.
*G06F 3/14*  (2006.01)
*G09G 3/20*  (2006.01)

(52) U.S. Cl.
CPC ............. *G09G 3/20* (2013.01); *G06F 3/1423* (2013.01); *G06F 3/1438* (2013.01); *G06F 3/1454* (2013.01); *G09G 2330/02* (2013.01); *G09G 2358/00* (2013.01); *G09G 2370/16* (2013.01)

(58) Field of Classification Search
None
See application file for complete search history.

(56) References Cited

U.S. PATENT DOCUMENTS

2017/0249919 A1\*  8/2017  Bae ................... H04N 1/00442
2020/0167013 A1  5/2020  Saito
2023/0067554 A1  3/2023  Asanuma

FOREIGN PATENT DOCUMENTS

| JP | 2003-233587 A | 8/2003 |
| JP | 2005-345543 A | 12/2005 |
| JP | 2014-006914 A | 1/2014 |
| JP | 2016-070980 A | 5/2016 |
| JP | 2019-165277 A | 9/2019 |

OTHER PUBLICATIONS

U.S. Appl. No. 18/155,298, filed Jan. 17, 2023.

\* cited by examiner

*Primary Examiner* — Joseph R Haley
(74) *Attorney, Agent, or Firm* — IPUSA, PLLC

(57) ABSTRACT

A display device, a display control method, a non-transitory recoding medium, and a display system. The display device receives an image from a terminal device by wireless communication, outputs the image to a display, acquires operation information on the image being displayed at the display, and displays a first display component together with the image, the first display component for receiving an operation that executes to stop the output of the image and restrict transmission of the operation information to the terminal device.

17 Claims, 19 Drawing Sheets

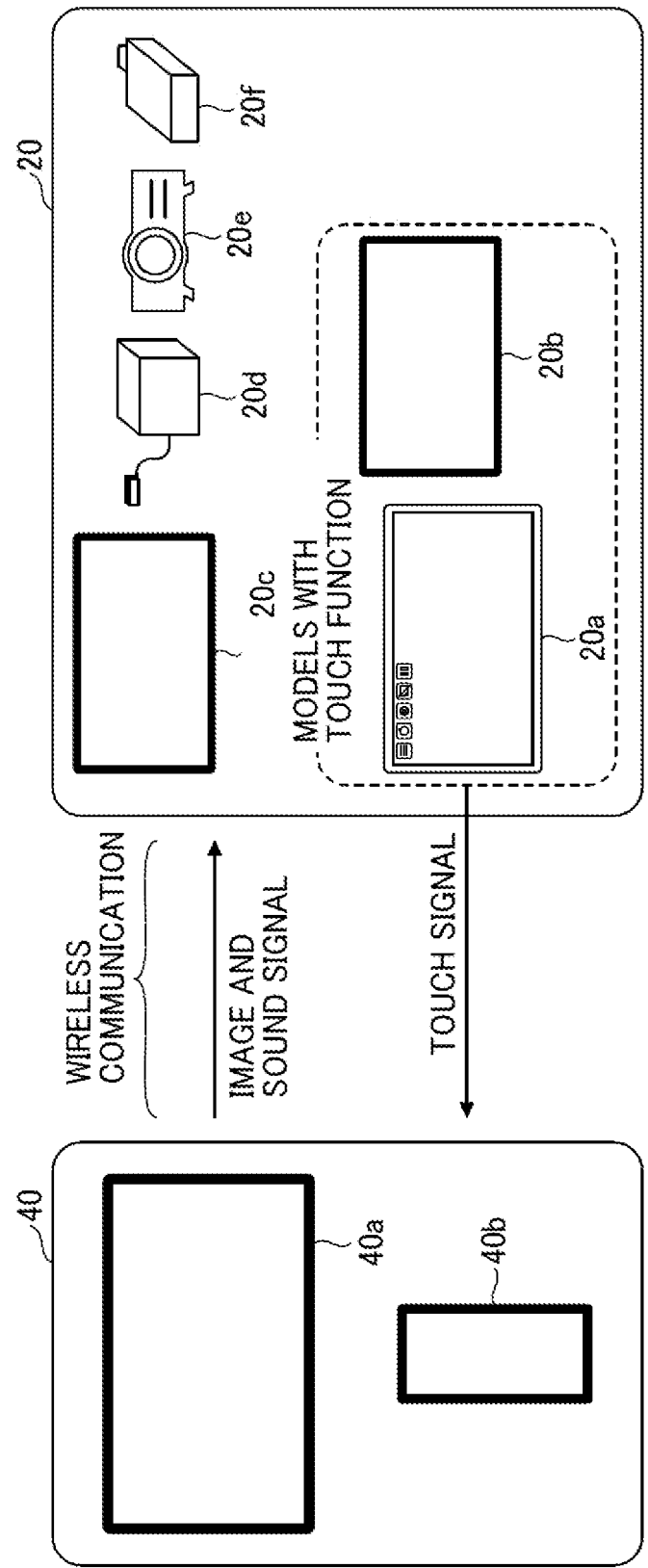

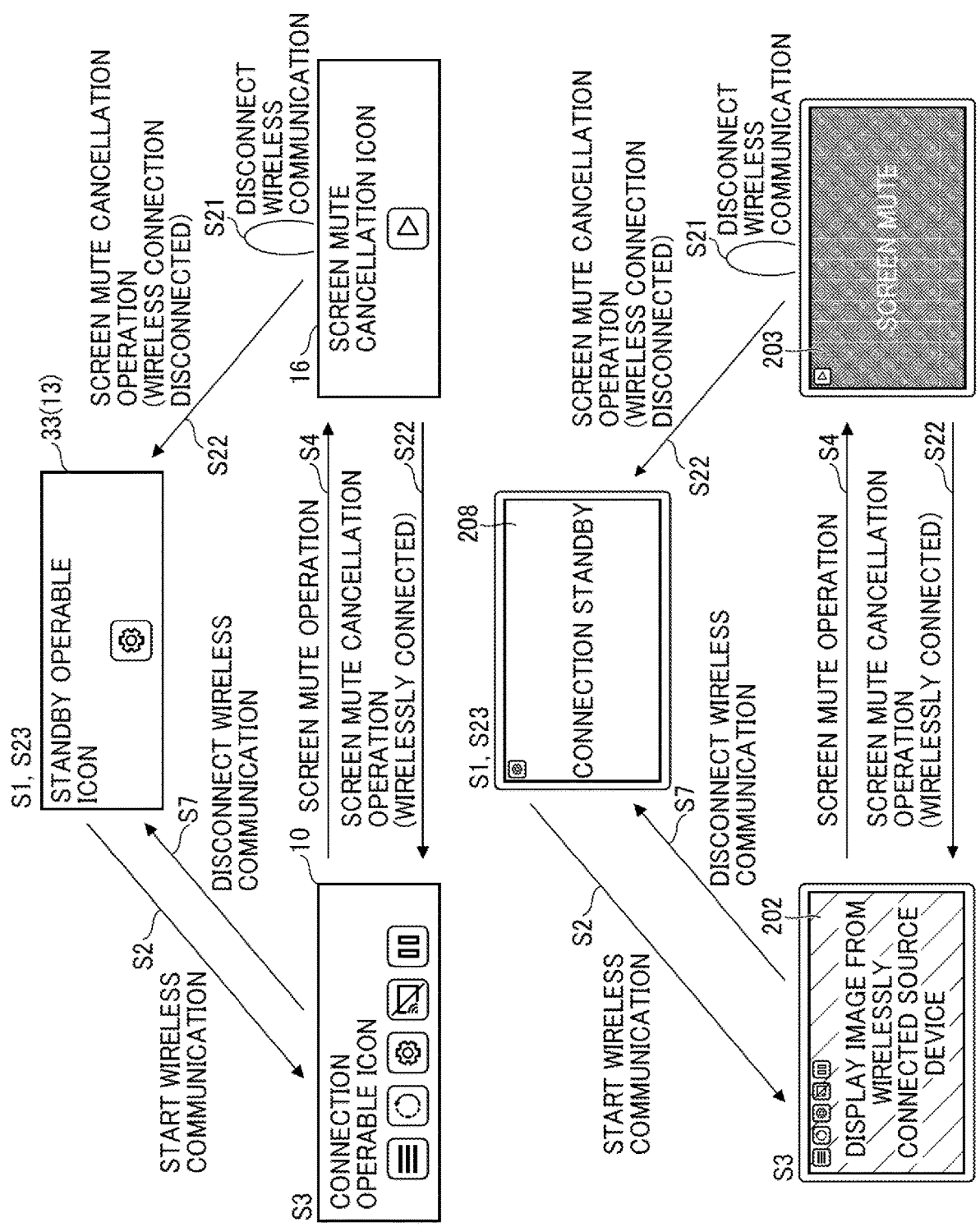

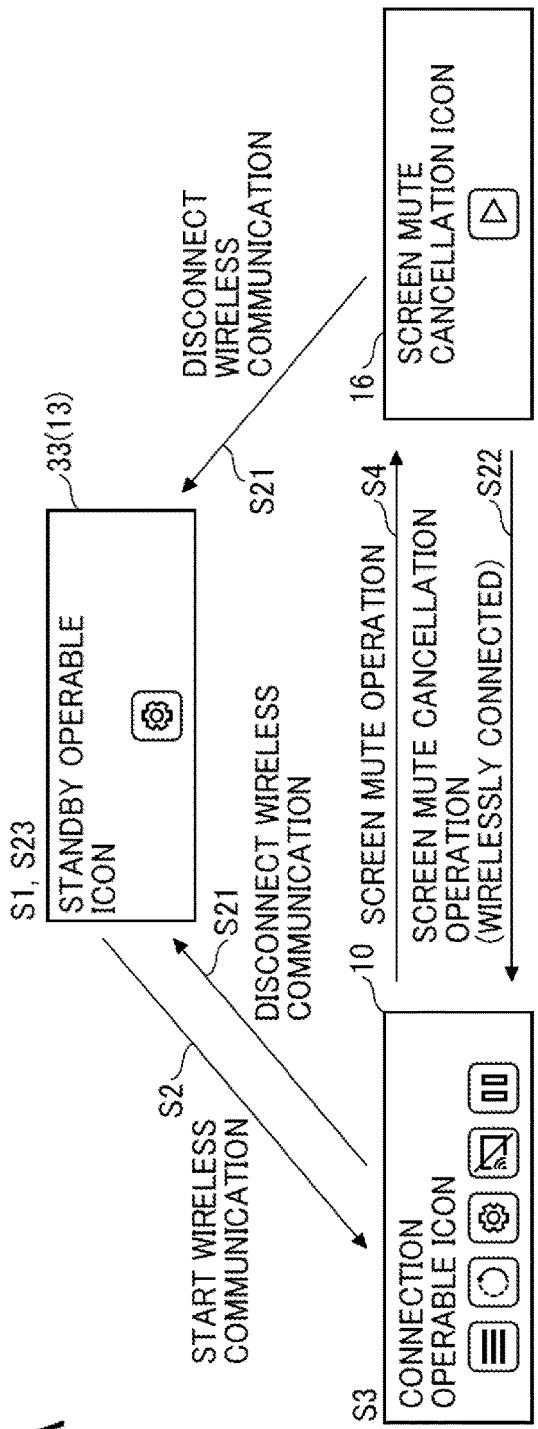
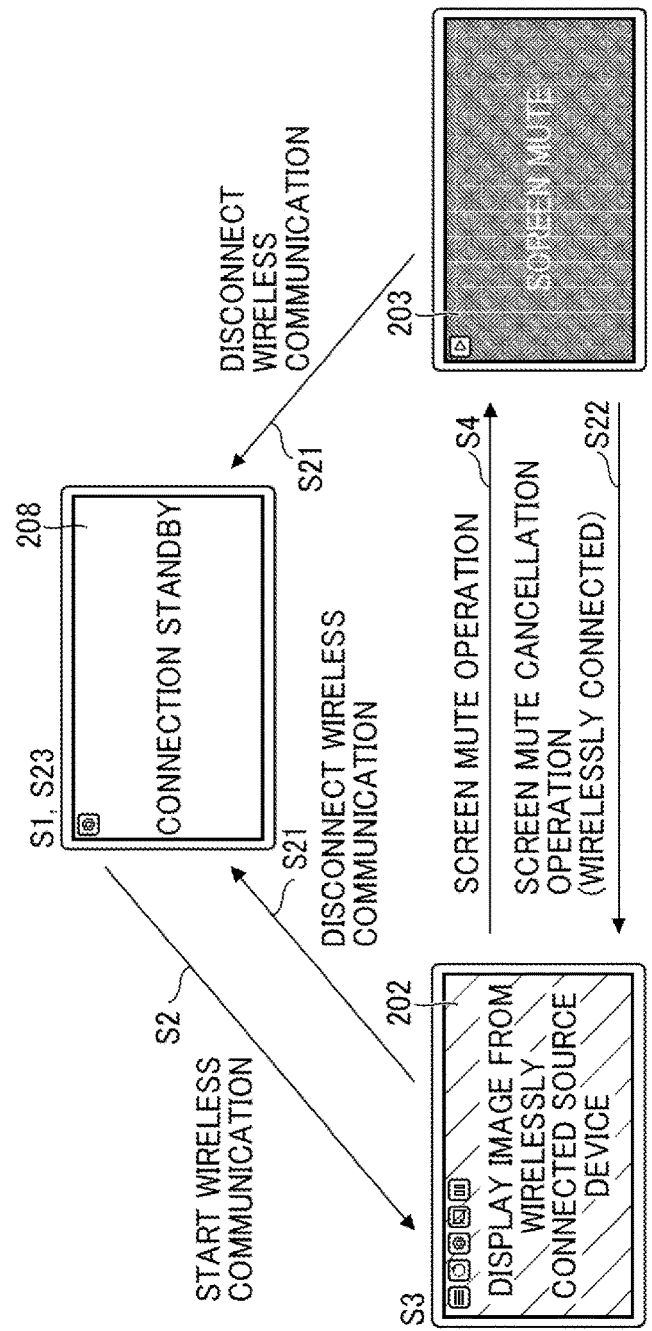
FIG. 12A
FIG. 12B

DISPLAY DEVICE, DISPLAY CONTROL METHOD, NON-TRANSITORY RECORDING MEDIUM, AND DISPLAY SYSTEM

CROSS-REFERENCE TO RELATED APPLICATIONS

This patent application is based on and claims priority pursuant to 35 U.S.C. § 119(a) to Japanese Patent Application No. 2022-156615, filed on Sep. 29, 2022, in the Japan Patent Office, the entire disclosure of which is hereby incorporated by reference herein.

BACKGROUND

Technical Field

The present disclosure relates to a display device, a display control method, a non-transitory recoding medium, and a display system.

Background Art

A known technique wirelessly outputs image and sound from terminal devices such as smartphones and personal computers (PCs) to display devices such as displays and projectors wirelessly connected to each other. In addition to transmission of image and sound signals, in the known technique, wireless communication enables a display device to operate a terminal device by sending a touch signal generated by a user touching the display device to the terminal device.

Further, a technique to conceal information displayed on the display device when the terminal device displays an image on the display device is disclosed. In such technique, the terminal device temporarily stops image output in response to a user's operation.

SUMMARY

Embodiments of the present disclosure describe a display device, a display control method, a non-transitory recoding medium, and a display system.

According to one embodiment, the display device receives an image from a terminal device by wireless communication, outputs the image to a display, acquires operation information on the image being displayed at the display, and displays a first display component together with the image, the first display component for receiving an operation that executes to stop the output of the image and restrict transmission of the operation information to the terminal device.

According to one embodiment, the display control method includes receiving an image from a terminal device by wireless communication, outputting the image to a display, acquiring operation information on the image being displayed, and displaying a first display component together with the image, the first display component for receiving an operation that executes to stop the output of the image and to restrict transmission of the operation information to the terminal device.

According to one embodiment, a non-transitory recording medium which, when executed by one or more processors on an information processing apparatus, cause the processors to perform a display control method including receiving an image from a terminal device by wireless communication, outputting the image to a display, acquiring operation information on the image being displayed, and displaying a first display component together with the image, the first display component for receiving an operation that executes to stop the output of the image and to restrict transmission of the operation information to the terminal device.

According to one embodiment, a display system receives an image from a terminal device by wireless communication, outputs the image to a display, acquires operation information on the image being displayed at the display, and displays a first display component together with the image, the first display component for receiving an operation that executes to stop the output of the image and restrict transmission of the operation information to the terminal device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2 is a diagram illustrating an example of a system configuration of the communication system;

FIGS. 11A and 11B are diagrams illustrating an example of transition of display in FIG. 10;

FIGS. 12A and 12B are diagrams illustrating an example of the transition of display in which screen mute is immediately canceled after the wireless communication is disconnected during screen mute;

Figure 1A:
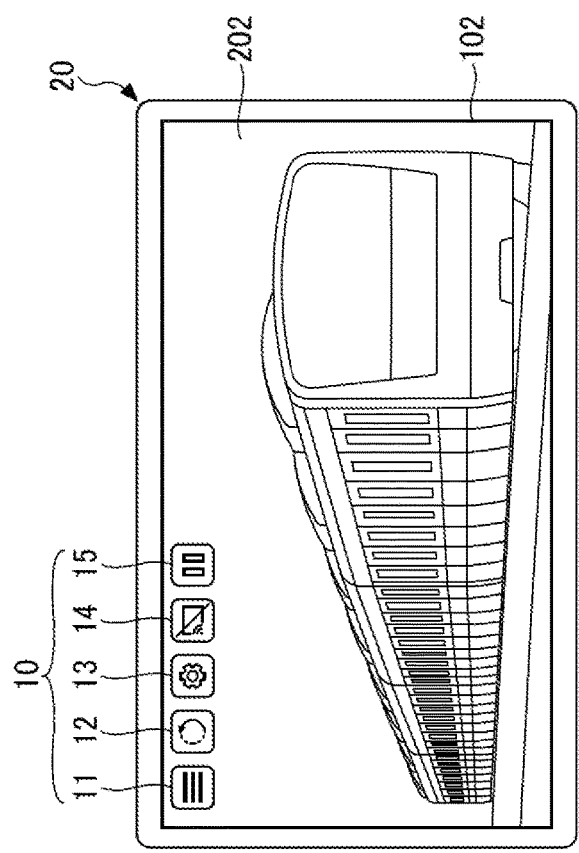
FIGS. 1A and 1B are schematic diagrams illustrating example operation of a communication system in which a display device outputs image and sound displayed by a terminal device.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, a communication system and a display control method performed by the communication system are described as an example of embodiments of the present disclosure.

Figure 1B:
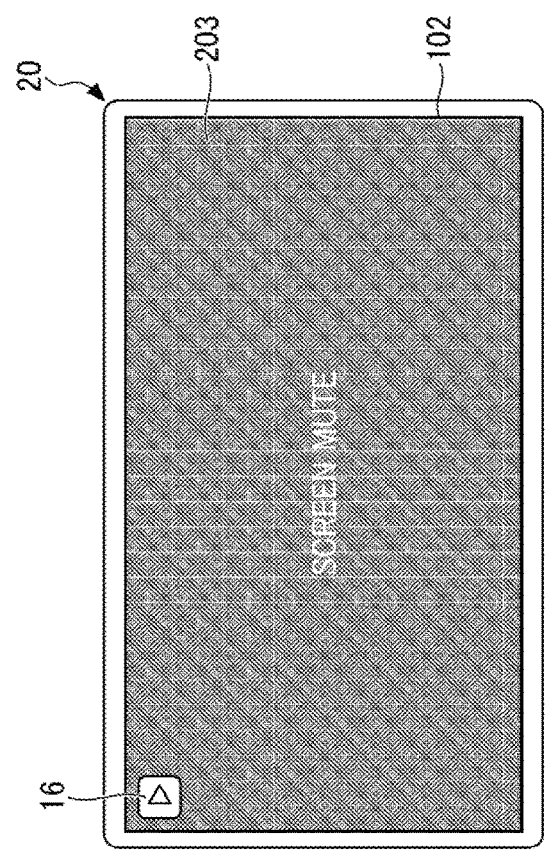

FIGS. 1A and 1B are schematic diagrams illustrating operation of a communication system 100 in which a display device 20 outputs an image and sound transmitted from a terminal device 40. As illustrated in FIG. 1A, the terminal device 40 and the display device 20 start wireless communication. The terminal device 40 displays an image 201 on the display and transmits data of the displayed image to the display device 20. Since the display device 20 displays an image 202 (based on the data of the image 201) on the display panel 102, the user can view the image on a relatively large screen.

In response to the terminal device 40 starting wireless communication with the display device 20, the display device 20 of the present embodiment causes the terminal device 40 to display a screen mute icon 15 (an example of the first display component) during image output. The screen mute icon 15 is a display component that allows the user to stop the display of the image 202 transmitted from the terminal device 40, mute the sound transmitted from the terminal device 40, and disable a touch panel with one touch (one operation).

FIG. 1B illustrates an example of the screen of the display device 20 after the screen mute icon 15 is pressed. The terminal device 40 continues to display the image 201 on the display of the terminal device 40, but the display device 20 displays a mute screen 203. The mute screen 203 may be any screen as long the image is difficult to recognize visually. Further, the display device 20 does not receive the touch by the user on the mute screen 203 displayed on the display panel 102 of the display device 20.

However, the display device 20 receives a touch operation on a screen mute cancellation icon 16 (an example of the second display component) displayed on the mute screen 203. The screen mute cancellation icon 16 is a display component for canceling the screen mute.

As described above, since the display device 20 of the present embodiment displays the screen mute icon 15 for stopping the output of the image and sound signals received by the display device 20 and the transmission of the touch signal with one touch, the user is able to turn off the image and sound and disable the touch signal to the terminal device 40 with a single operation.

In the display device 20 such as a portable display, the user is assumed to move the display device 20 from place to place, carry the display device 20 to various places, and change the terminal device 40 to connect and display image in various environments. In such an environment, both operability and security can be improved by disabling image and sound output as well as touch operation when the user leaves the seat or moves, and the display device 20 that is easy to use in various environments can be provided. In the case the user leaves the seat or moves for a short period of time, operation of the terminal device 40 to stop transmission of the image and sound has been troublesome for the user with the conventional technique.

Further, in the case the user stops the transmission of image and sound from the terminal device 40 (disconnection of wireless communication), the user is forced to perform reconnection work with the display device 20 in order to resume connection. Since the terminal device 40 can be operated by the touch operation on the display device 20, the user may keep the terminal device 40 in a pocket of bag or clothes, and the operation of the terminal device 40 is inconvenient for the user. For this reason, the user tends to hesitate to operate the terminal device 40 to stop the image and sound, especially in the case of moving or leaving the seat for a short period of time. Since the display device 20 of the present embodiment maintains wireless communication with the terminal device 40 even while the mute screen 203 is being displayed, the display device 20 can resume outputting the image 202 and sound from the terminal device without reconnection work.

Display components are various components displayed on the screen. A display component is a mark for touch-operation. In the present embodiment, an icon is exemplified as the display component, but the display component may be a button, an operation menu, a symbol, a figure, or the like. The icon is a symbolic expression of an element with a simple pattern.

A display may be any device as long as the display includes a function of displaying the image from the terminal device. The display is, for example, a display device such as a liquid crystal display or a projection function of a projector. The image may be a still image or moving image.

Operation information is information acquired based on an operation on the display of the display device 20, and is, for example, operation position information. The operation position information is obtained by converting position information detected with respect to the display panel 102 of the display device 20 into position information on the terminal device 40 to receive an operation. The operation position information is, for example, X and Y coordinates on the image or screen displayed by the terminal device 40. The operation information may be information indicating whether the display device 20 has been operated, or information indicating that another button of the display device 20 has been pressed, in addition to the operation position information.

The screen mute refers to at least reducing visibility of the image transmitted from the terminal device 40 to such an extent that the user is not able to recognize the image. The screen mute may also stop sound output from the terminal device.

A restriction on transmission of the operation position information indicates that even in the case the user touches the touch panel and the touch panel detects the touch, the display device 20 does not transmit the information indicating the detection to the outside.

An example of a system configuration of the communication system 100 is described with reference to FIG. 2. FIG. 2 is a diagram illustrating the system configuration of the communication system 100. The terminal device 40 and the display device 20 communicates wirelessly. Wireless communication includes, for example, Wi-Fi DIRECT (registered trademark), BLUETOOTH (registered trademark), and the like, but the communication method is not particularly limited. Further, a communication method may be communication through a Wi-Fi router (access point) instead of one-to-one communication (point to point (P2P)). Alternatively, the terminal device 40 and the display device 20 may communicate through a same server. In this case, the terminal device 40 and the display device 20 are associated by the server, and the server transmits the image 202 and the sound from the terminal device 40 to the display device 20, and a touch signal from the display device 20 is transmitted to the terminal device 40.

As communication standards that enable the wireless communication between the terminal device 40 and the display device 20, MIRACAST, GOOGLE CAST, and AIRPLAY (all of which are registered trademarks; hereinafter, description of the registered trademarks is omitted) are known. The terminal device 40 and the display device 20 communicate using these communication standards or a communication system improved from the communication standards. For example, MIRACAST is a display transmission technology through one-to-one wireless communication established by the Wi-Fi Alliance. MIRACAST uses a streaming technology to send image, sound, and image from a host to another wirelessly paired device. A display connection using a dedicated cable can be made wireless, and for example, since the functions implemented by HIGH-DEFINITION MULTIMEDIA INTERFACE (HDMI) (registered trademark) are made wireless, MIRACAST is sometimes called wireless HDMI.

Also, the terminal device 40 and the display device 20 may be connected through a wired image output interface such as HDMI, DISPLAYPORT (registered trademark), THUNDERBOLT (registered trademark), or the like.

The terminal device 40 is, for example, a personal computer (PC) 40*a* (desktop PC, notebook PC, etc.), a smart phone 40*b*, a tablet terminal, or the like used by the user. The terminal device 40 executes an application compatible with the wireless communication, an application for reproducing image, and the like. The terminal device 40 may be portable by the user, but may be of a stationary device. The terminal device 40 may have a general-purpose configuration, and special hardware or installation of an application dedicated to the present embodiment may not be used. However, in case the dedicated application is installed in the display device 20 of the present embodiment, the user's convenience is further improved.

A device such as the terminal device 40 that transmits content (source) to be output is called a source device. The source device does not refer to a specific device, but to a source of content. Similarly, a device that receives content to be output, such as the display device 20, is called a sink device. The sink device does not refer to a specific device, but to a destination of content. Therefore, the terminal device 40 may be the sink device, and the display device 20 may be the source device.

The display device 20 is, for example, a display 20*a* such as liquid crystal or organic electro luminescence (EL), a PC 20*b* (display integrated type), a television receiver 20*c*, a set-top box 20*d*, a projector 20*e*, or a wireless communication device 20*f*. The display device 20 may include at least a wireless communication function, and may further include a display function. The display 20*a*, the PC 20*b*, the television receiver 20*c*, and the projector 20*e* include the display function, and the set-top box 20*d* and wireless communication device 20*f* do not include the display function.

The display device 20 (excluding the wireless communication device 20*f*) may include a built-in wireless communication function, or may be provided with an external communication device having a wireless communication function. Since the wireless communication device 20*f* includes a wireless communication function, the wireless communication device 20*f* may be externally attached to the display device 20 other than the wireless communication device 20*f*. For example, by connecting the wireless communication device 20*f* to the universal serial bus (USB) interface (I/F) of the display 20*a*, the PC 20*b*, the television receiver 20*c*, the set-top box 20*d*, and the projector 20*e*, which do not have the wireless communication function, the devices listed above wirelessly communicate with the terminal device 40. The wireless communication device 20*f* connected to the display 20*a*, the PC 20*b*, the television receiver 20*c*, the set-top box 20*d*, or the projector 20*e* may be referred to as a display system.

As the set-top box 20*d*, for example, a cable television receiver and a satellite broadcasting receiver are known. As the wireless communication device 20*f*, devices compatible with MIRACAST, GOOGLE CAST, and AIRPLAY, stick-type PCs, and the like are known.

The display device 20 is preinstalled or installable with an application compatible with the wireless communication or the wireless communication function. A part or all of the functions may be implemented by hardware circuitry.

The display device 20 preferably includes a touch panel. The display device 20 wirelessly transmits to the terminal device 40 a touch signal generated by the touch operation of the user and enables the user to operate the terminal device 40 on the display device 20.

Figure 3:
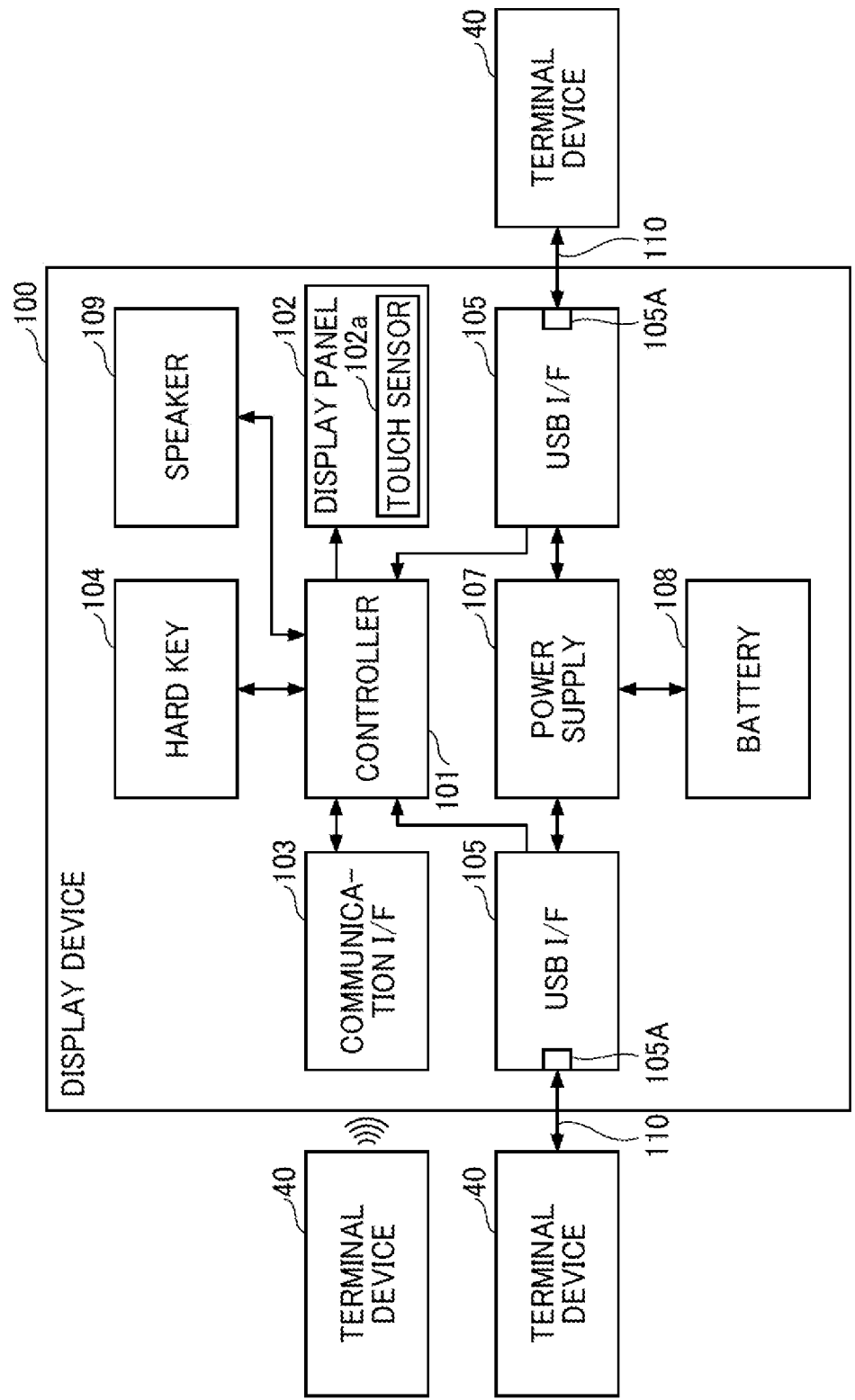
FIG. 3 is a block diagram illustrating an example of a hardware configuration of the display device according to one embodiment.
Figure 4:
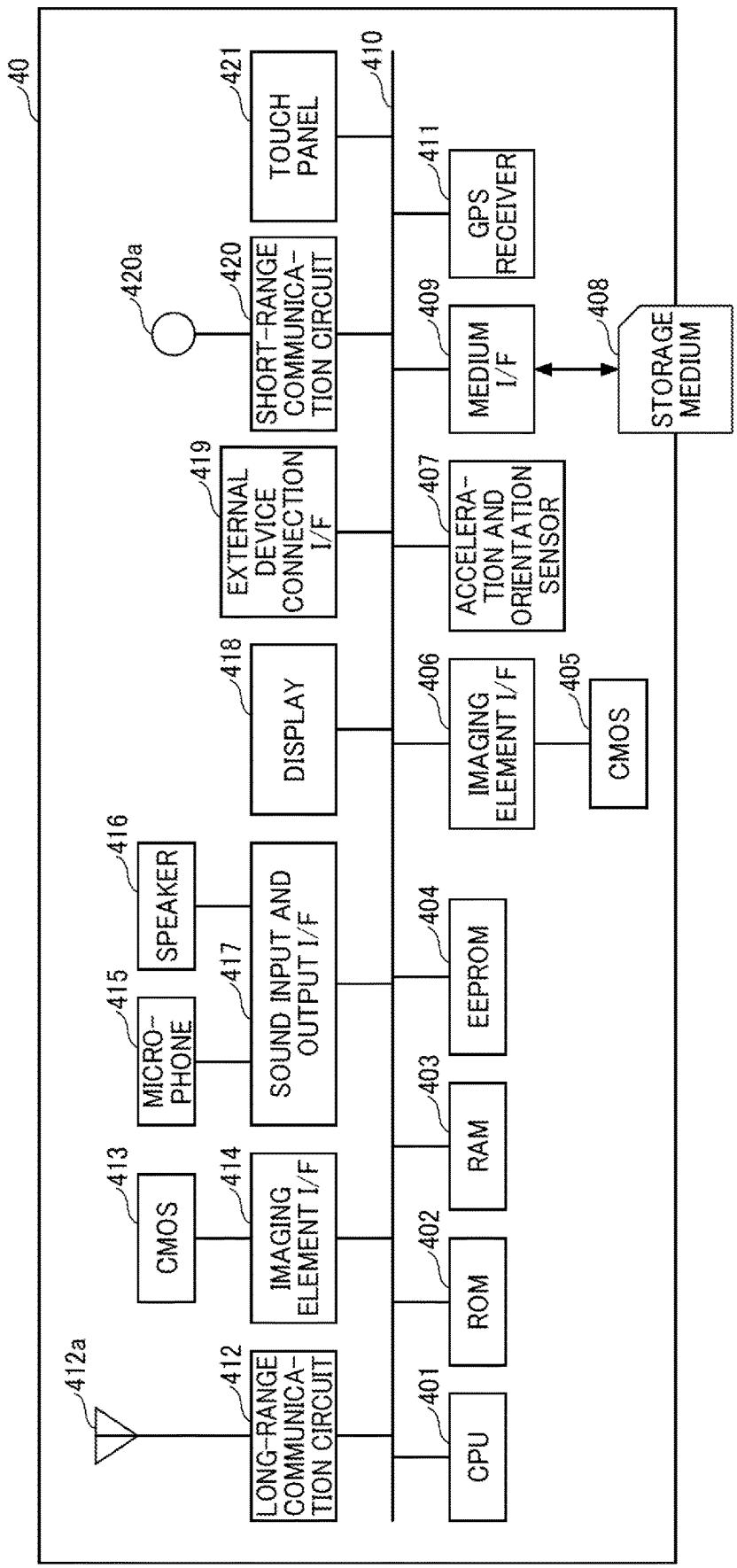
FIG. 4 is a block diagram illustrating an example of a hardware configuration of the terminal device.

With reference to FIGS. 3 and 4, hardware configurations of the display device 20 and the terminal device 40 are described according to an embodiment.

FIG. 3 is a block diagram illustrating an example of a hardware configuration of a display device 20 according to one embodiment.

The display device 20 illustrated in FIG. 3 includes a display panel 102 on the front of a housing, and receives an image signal from the terminal device 40 through the wireless communication or an image signal conversion cable 110, and displays the image corresponding to the image signal on the display panel 102. The display device 20 is a thin, portable display device 20 including a battery 108. The display device 20 can be used as an extended display for the terminal device 40 by being carried with the terminal device 40 and connected to the terminal device 40 when used.

For example, the display device 20 can be used by a sales representative as the extended display for presentations at a point of sale. As another example, the display device 20 can be used as a second display for office work together with the terminal device 40 such as the PC. Further, for example, the display device 20 can be used as the extended display for watching movies or working at home by connecting to the smartphone used by an individual outside the office.

As illustrated in FIG. 3, the display device 20 includes a controller 101, the display panel 102, a communication interface (I/F) 103, a hard key 104, a speaker 109, a universal serial bus (USB) I/F 105, a power supply 107, and the battery 108.

The controller 101 controls an overall operation of the display device 20. For example, the controller 101 is implemented by a control circuit such as an integrated circuit (IC) including a central processing unit, a read only memory (ROM), a random access memory (RAM), and the like.

The display panel 102 displays various images (moving images, still images, and the like) according to the image signal supplied from the controller 101. As the display panel 102, for example, the liquid crystal panel, the organic EL panel, or the like is used. A touch sensor 102*a* is provided on the front surface of the display panel 102 so as to overlay the surface of display panel 102. The speaker 109 outputs various sounds according to the sound signal supplied from the controller 101.

The communication I/F 103 is an interface that controls the wireless communication and connection of the wireless communication with the terminal device 40. The communication I/F 103 is wirelessly connected to the terminal device 40 (for example, a notebook computer, a smartphone, and the like), and performs transmission and reception (wireless communication) of control signals, image signals, and the like with the terminal device 40. As the wireless communication standard used by the communication I/F 103, for example, Wi-Fi or the like is used.

The hard key 104 is an interface that receives input from the user by being operated by the user. For example, the display device 20 includes, as the hard keys 104, a plurality of buttons provided on a side surface of the housing, the front surface of the housing, and the like. These buttons are, for example, a power button, a select button, an enter button, a return button, and the like. The display device 20 is not limited to this example, and the display device 20 may include, as the hard key 104, a screen mute key that implements the screen mute icon 15 with a hard key, for example. For example, the display device 20 can perform various settings such as power on/off, brightness and contrast by operating the hard keys 104 by user operation.

The USB I/F 105 is an interface for connecting the terminal device 40. The USB I/F 105 includes a USB port 105A (an example of "connector") conforming to the USB standard, and a USB cable such as an image signal conversion cable 110 is connected to the USB port 105A. Thereby, the USB I/F 105 is connected to the terminal device 40 through the USB cable. For example, when a terminal (for example, a notebook computer, a smartphone, etc.) is connected as the terminal device 40, the USB I/F 105 can transmit and receive control signals, image signals, power, etc. to and from the terminal. Further, for example, when an external power supply is connected as the terminal device 40, the USB I/F 105 can receive power supplied from the external power supply.

The display device 20 includes a plurality of USB I/Fs 105, and the terminal device 40 can be connected to each of the plurality of USB I/Fs 105. In the example illustrated in FIG. 3, the display device 20 includes two USB I/Fs 105. However, the present disclosure is not limited to this example, and the display device 20 may include three or more USB I/Fs 105.

The power supply 107 controls supply of driving power to each unit of the display device 20. For example, in the case the power is not supplied to the power supply 107 from the terminal device 40 (external power supply, terminal, etc.), or when the power supplied from the terminal device 40 (external power supply, terminal, etc.) is insufficient, electric power stored in the battery 108 is supplied to each unit of the display device 20. Further, for example, when power is supplied from the terminal device 40 (external power supply, terminal, etc.), the power supply 107 supplies the power supplied from the terminal device 40 to each unit of the display device 20. Further, for example, the power supply 107 passes through power, which is supplied from the terminal device 40 (external power supply, terminal, etc.) connected to the USB I/F 105 to the terminal device 40 (terminal or the like) connected to another USB I/F 105.

The battery 108 stores electric power for driving the display device 20. Various types of rechargeable secondary batteries (for example, lithium ion batteries, lithium polymer batteries, etc.) are used for the battery 108. The display device 20 (for example, the power supply 107) can charge the battery 108 with power supplied from the terminal device 40 (external power supply, terminal, etc.) connected to the USB I/F 105.

FIG. 4 is a block diagram illustrating an example of a hardware configuration of the terminal device 40. In FIG. 4, a smartphone is used as an example of the terminal device 40. As illustrated in FIG. 4, the terminal device 40 includes a CPU 401, a ROM 402, a RAM 403, an electrically erasable programmable read-only memory (EEPROM) 404, a complementary metal oxide semiconductor (CMOS) sensor 405, an imaging element I/F 406, an acceleration and orientation sensor 407, a medium I/F 409, and a global positioning system (GPS) receiver 411.

The CPU 401 controls the operation of the entire terminal device 40. The ROM 402 stores a program such as an initial program loader (IPL) to boot the CPU 401. The RAM 403 is used as a work area for the CPU 401.

The EEPROM 404 reads or writes various data such as programs for the terminal device 40 under the control of the CPU 401.

The CMOS sensor 405 is an example of a built-in imaging device that captures an object (mainly, a self-image of a user) under the control of the CPU 401 to obtain image data such as a photograph. The CMOS sensor may be an imaging device such as a charge coupled device (CCD) sensor.

The imaging element I/F 406 is a circuit for controlling a drive of the CMOS sensor 405. The acceleration and orientation sensor 407 includes various sensors such as an electromagnetic compass for detecting geomagnetism, a gyrocompass, and an acceleration sensor.

The medium I/F 409 controls reading or writing (storage) of data from or to a storage medium 408 such as a flash memory. The GPS receiver 411 receives a GPS signal from a GPS satellite.

In addition, the terminal device 40 includes a long-range communication circuit 412, a CMOS sensor 413, an imaging element I/F 414, a microphone 415, a speaker 416, a sound input and output I/F 417, a display 418, an external device connection I/F 419, a short-range communication circuit 420, an antenna 420a of the short-range communication circuit 420, and a touch panel 421.

The long-range communication circuit 412 is a circuit that communicates with other devices over a wired or wireless network. The long-range communication circuit 412 is capable of wireless communication such as Wi-Fi. The CMOS sensor 413 is a built-in imaging element for capturing an image of a subject and obtaining image data such as the photograph under the control of the CPU 401.

The imaging element I/F 414 is a circuit for controlling drive of the CMOS sensor 413. The microphone 415 is a built-in circuit that converts a sound into an electric signal.

The speaker 416 is a built-in circuit that generates the sound such as music or voice by converting an electric signal into physical vibration. The sound input and output I/F 417 is a circuit that processes sound signal input and output between the microphone 415 and the speaker 416 under the control of the CPU 401.

The display 418 is an example of a display device that displays an image of the object, various icons, etc. Examples of the display 418 include a liquid crystal display (LCD) and an organic electroluminescence (EL) display. The external device connection I/F 419 is an interface for connecting various external devices.

The short-range communication circuit 420 is a communication circuit that communicates in compliance with the Near Field Communication (NFC), the BLUETOOTH (registered trademark), and the like. The touch panel 421 is one example of an input device that allows the user to operate the terminal device 40 by touching a screen of the display 418.

The terminal device 40 further includes a bus line 410. The bus line 410 is an address bus or a data bus, which electrically connects the elements in FIG. 4 such as the CPU 401.

Figure 5:
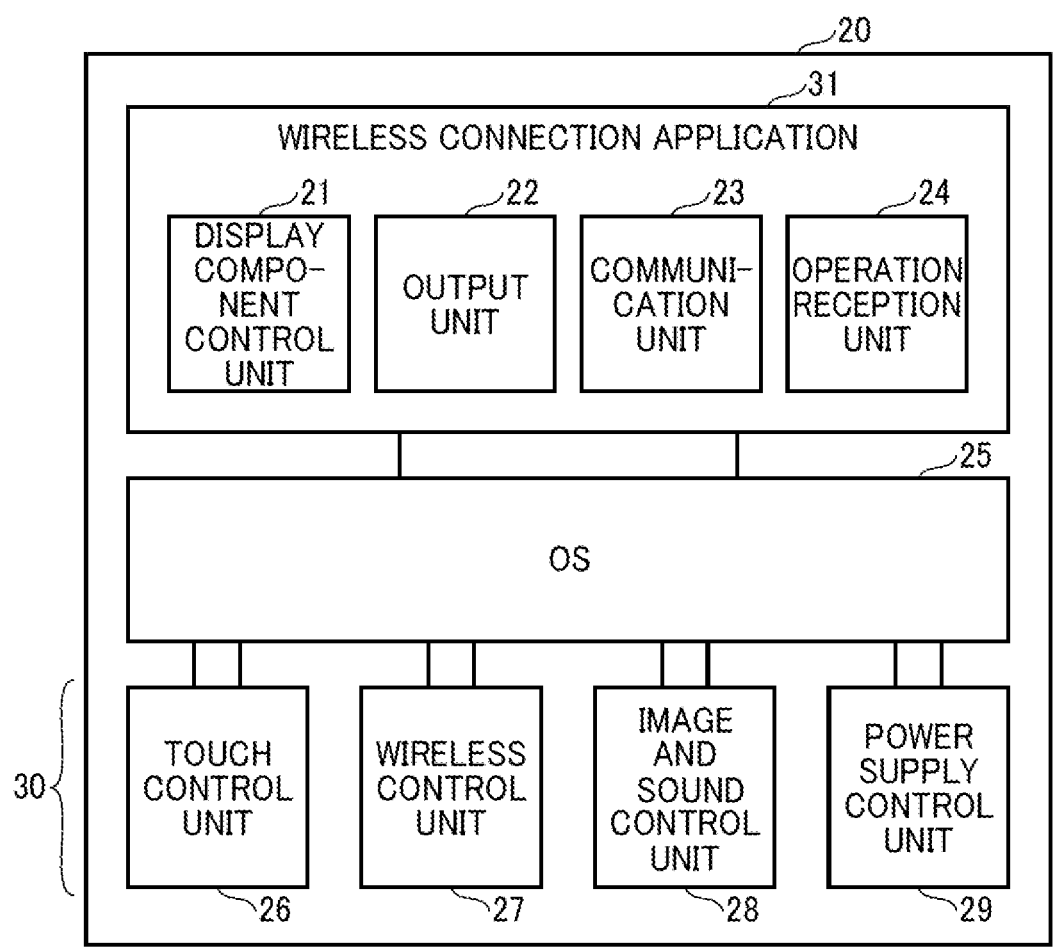
FIG. 5 is a diagram illustrating an example of a functional configuration of the display device divided into blocks.

FIG. 5 is a diagram illustrating a functional configuration of the display device 20 divided into blocks. The functions of the display device 20 are mainly arranged in three layers, which are a hardware control unit 30, an operating system (OS) 25, and a wireless connection application 31 from the bottom. Major applications that run on the OS 25 are illustrated in the description of the present embodiment, although there are other applications that run on the OS 25.

The hardware control unit 30 includes a touch control unit 26, a wireless control unit 27, an image and sound control unit 28 and a power supply control unit 29. Each of these functions included in the hardware control unit 30 may be implemented by, for example, a device driver.

The touch control unit 26 converts the signal input from the touch sensor 102a into coordinates (X and Y coordinates with the origin at the upper left corner of the display panel 102, for example), and sends the coordinates to the OS 25. The touch control unit 26 may further convert the signal input into a touched area or a pressure indicated by the signal input and send the signal to the OS 25.

The wireless control unit 27 performs filtering, amplification, demodulation, analog/digital (A/D) conversion, etc. on radio waves of radio communication received by the communication I/F 103 to convert the radio waves into digital signals, performs decapsulation on the signals according to the communication protocol, and extracts data from the signals. The wireless control unit 27 sends the data that is extracted to the OS 25. The data that is extracted is image data and sound data from the terminal device 40. The wireless control unit 27 also acquires data from the OS 25, performs data encapsulation, digital/analog (D/A) conversion, modulation, and amplification according to the communication protocol, respectively, on the data that is acquired, and transmits radio waves for wireless communication from the communication I/F 103. This data is the touch signal.

The image and sound control unit 28 converts the image data acquired from the OS 25 to have a particular format with colors of red, green, and blue (RGB) that the display panel 102 supports, and stores the image data in a video memory. The image and sound control unit 28 applies a voltage to each cell of the display panel 102 according to the image data acquired from the video memory. Further, the image and sound control unit 28 generates a differential signal from the sound data acquired from the OS 25, and outputs the differential signal to a plus terminal and minus terminal of the speaker.

The power supply control unit 29 controls the power supply from the battery or the power supply from the external power supply according to a shutdown process from the OS 25 or an input status of a power switch or the external power supply. In the case enough power is available from the external power source, the power supply control unit 29 charges the battery. The power supply control unit 29 manages the remaining power of the battery. The power supply control unit 29 stops power supply to the display panel 102 according to the non-operation time, and restarts power supply to the display panel 102 in response to detection of an operation.

The wireless connection application 31 includes a display component control unit 21, an output unit 22, a communication unit 23 and an operation reception unit 24. Each function of the wireless connection application 31 is a function implemented by the CPU of the controller 101 executing instructions included in the wireless connection application 31.

The display component control unit 21 mainly controls display of the icons. The display component control unit 21 controls display of the icons in an icon layer, which is described below, according to the operation of the icon, the status of wireless communication with the terminal device 40, and the like. In addition to the icons, the display component control unit 21 also displays user interfaces such as various setting screens.

The output unit 22 acquires from the OS 25 at least one of the image data and sound data received by the wireless control unit 27 from the terminal device 40 and controls the output by the image and sound control unit 28. The output unit 22 displays the image 202 transmitted from the terminal device 40 on a source image display layer, which is described below, and outputs sound from the speaker 109. During the screen mute, the output unit 22 displays the mute screen 203 instead of the image 202 transmitted from the terminal device 40 on the source image display layer 210.

The communication unit 23 sends a service set identifier (SSID) and encryption key to the wireless control unit 27, and instructs a start of the wireless communication with the terminal device 40, a maintenance of the communication, and an end of the wireless communication. The communication unit 23 communicates directly with the terminal device 40 or communicates with the terminal device 40 through the router (access point).

The operation reception unit 24 receives touch operations on icons and touch operations on the image 202 from the terminal device 40. The operation reception unit 24 receives pressing of the icon in the case the touch coordinates are within a circumscribing rectangle of the icon, and receives an operation to the terminal device 40 in the case the touch coordinates are not within the circumscribing rectangle of the icon but within the image display range. Further, during the screen mute, the operation reception unit 24 does not receive any touch other than the screen mute cancellation icon 16.

In response to an operation on the terminal device 40, the communication unit 23 transmits a touch signal to the terminal device 40. The touch signal is obtained by converting touch coordinates on the display device 20 into coordinates on the display (image) of the terminal device 40. The converted coordinates are, for example, a ratio of the X coordinate to a width of the image on the display device 20 and a ratio of the Y coordinate to a height of the image on the display device 20.

Figure 6:
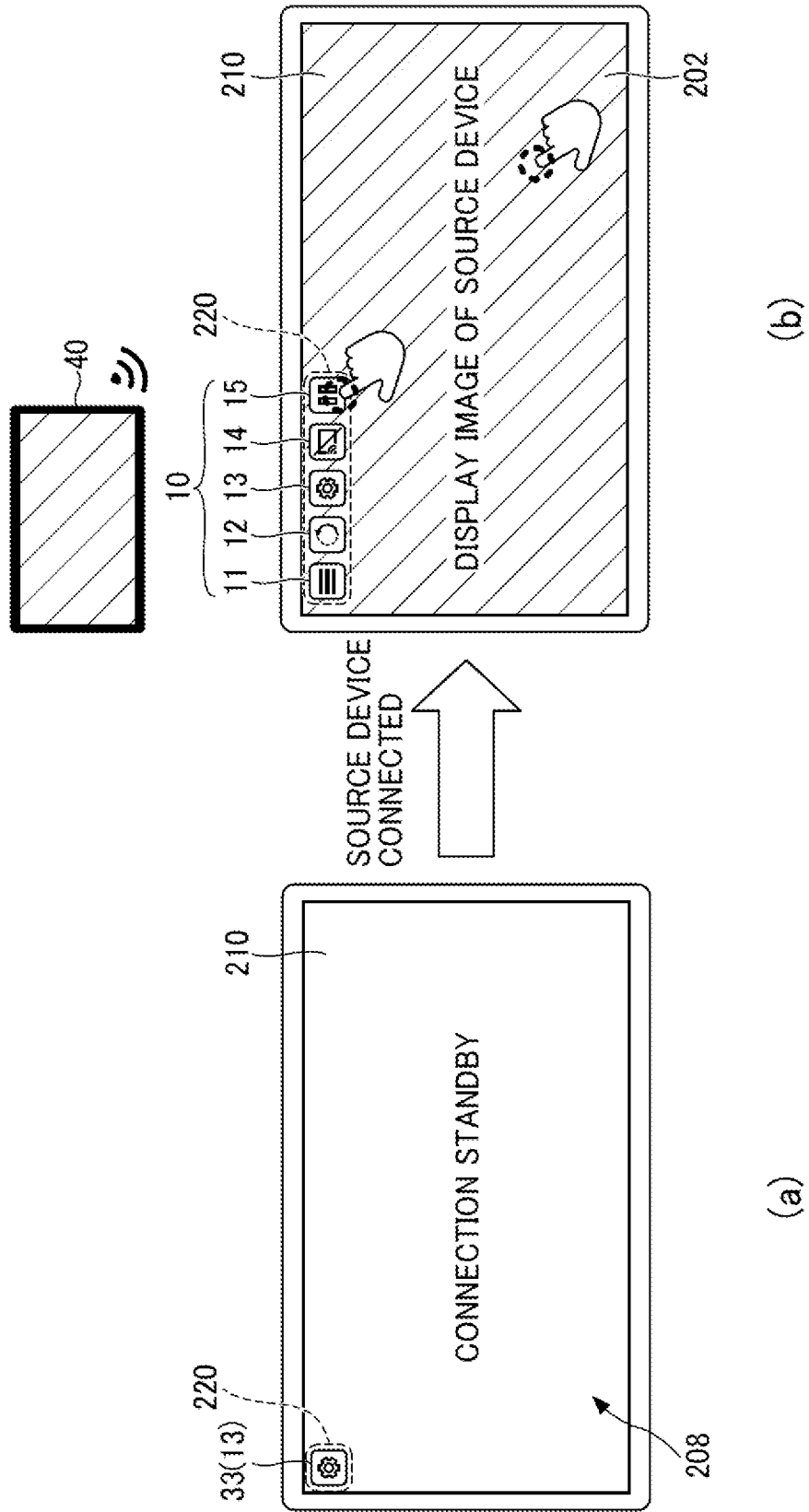
FIG. 6 is a diagram illustrating example display layers displayed by the display device for screen display.

With reference to FIG. 6, an example of a screen displayed by the display device 20 communicating with the terminal device 40 is described.

FIG. 6 is a diagram illustrating display layers displayed by the display device 20 for screen display. The display device 20 includes two display layers.

1. The source image display layer 210 is a display layer for displaying image received from the terminal device 40. The source image display layer 210 may be approximately the same size as the display panel 102.

2. The icon layer 220 is a display layer for displaying icons related to the wireless communication with the terminal device 40. The icon layer 220 may be approximately the same size as the display panel 102.

The source image display layer 210 and the icon layer 220 are entirely overlapped. The icon layer 220 is displayed in front of the source image display layer 210 so that the icon is not hidden by the image (the icon layer 220 is on the user's side).

An image is drawn on the source image display layer 210 by the output unit 22, and an icon is drawn on the icon layer 220 by the display component control unit 21. The user is able to change positions of the icons in the icon layer 220.

A touch operation on the icon layer 220 is also a touch operation on the source image display layer 210, but when an icon is touched, a touch on an icon located in front of the image 202 is detected. A touch operation on the source image display layer 210 other than the icon is detected as a touch operation on the image. Hereinafter, the touch operation on the source image display layer 210 is referred to as a touch operation on the image 202 transmitted from the terminal device 40.

As illustrated in FIG. 6 (a), a connection standby screen 208 is displayed on the source image display layer 210 when the wireless communication with the terminal device 40 is not performed. The connection standby screen 208 is a screen displayed by the display device 20 activated when the power is turned on. The connection standby screen 208 is a screen that displays that the wireless communication connection is on standby, and connection information such as the SSID and encryption key.

A main body setting icon 13 is displayed on the icon layer 220 in a status in which wireless communication with the terminal device 40 is not established. The main body setting icon 13 is used for settings such as screen brightness, volume, and wireless communication settings (access point SSID, password, etc.).

As illustrated in FIG. 6(b), when the display device 20 starts the wireless communication with the terminal device 40, the image 202 displayed by the terminal device 40 is displayed on the source image display layer 210. The image 202 transmitted from the terminal device 40 is the entire screen displayed on the display 418 by the terminal device 40. For example, a part of the screen displayed on the display 418 by the terminal device 40 may be transmitted.

In the case the terminal device 40 and the display device 20 are communicating wirelessly, the icon layer 220 displays various icons (connection operable icons 10) for the user to set image and sound while image is being output. The connection operable icon 10 is an icon for the user to adjust image and sound while the display device 20 is communicating wirelessly with the terminal device 40. For example, the connection operable icons 10 are as follows, but more or fewer icons may be used.

A grouping icon 11 is an icon for grouping the connection operable icons 10 into one. The display component control unit 21 reduces the display area of the connection operable icon 10, thereby improving the visibility of the image 202 transmitted from the terminal device 40. The grouping icon 11 becomes translucent when the connection operable icons 10 are grouped into one.

A rotation icon 12 is an icon for rotating the image 202 transmitted from the terminal device 40 by 90 degrees.

The main body setting icon 13 is as described above.

A disconnection icon 14 is an icon for disconnecting the wireless communication with the terminal device 40.

A screen mute icon 15 is an icon for muting the screen of the display device 20 (hiding image, stopping sound output, and disabling touch operations other than the screen mute cancellation icon 16). Details are described with reference to FIG. 7.

As for the connection operable icon 10, the grouping icon 11 alone is displayed and the grouping icon 11 becomes translucent when the non-operating time reaches a predetermined time. The display component control unit 21 improves the visibility of the image 202 transmitted from the terminal device 40. In response to the user touching the translucent grouping icon 11, the entire connection operable icon 10 is displayed. The grouping icon 11 may be hidden after a certain period of time has elapsed since the grouping icon became translucent.

In the case the image 202 transmitted from the terminal device 40 is touched while the grouping icon 11 is translucent, the grouping icon 11 remains translucent because the icon is not operated. In response to receiving the touch signal on the image 202 transmitted from the terminal device 40, the terminal device 40 displays buttons such as pause, forward, and return on the display 418, and the same buttons as those of the terminal device 40 are displayed on the display device 20 by receiving the image from the terminal device 40. The user performs operations such as pause, forward, and return on the terminal device 40 on the display device 20.

The touch operations on the icons are used for processing operations on the display device 20. On the other hand, a touch operation on the image 202 sent from the terminal device 40 is transmitted as a touch signal including touch coordinates on the image to the terminal device 40 connected by the wireless communication. In this way, the icon layer 220 and the source image display layer 210 differ in handling of touch signals in response to the touch by the user.

The connection operable icon 10 is not displayed while the image is not being output. The display device 20 displays the connection operable icon 10 simultaneously with the start of the output of the image and deletes the connection operable icon 10 simultaneously with the end of the output of the image. Accordingly, the user is notified that the user can use the connection operable icon 10 to operate the image.

Figure 7:
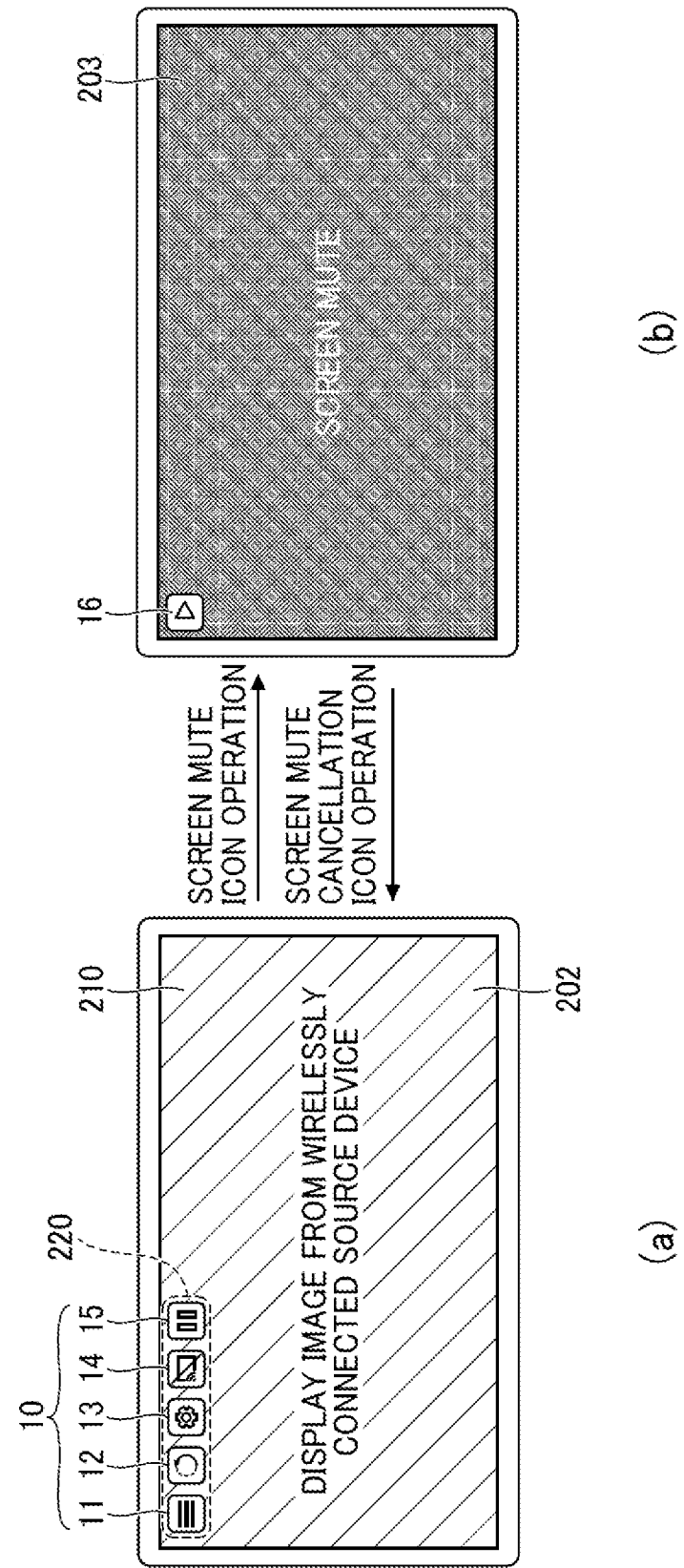
FIG. 7 is a diagram illustrating an example function of a screen mute icon.

FIG. 7 is a diagram illustrating a function of the screen mute icon 15. The screen mute icon 15 is an icon for activating the screen mute function. By pressing the screen mute icon 15, the display device 20 performs the following three controls (screen mute function) simultaneously (in parallel). FIG. 7(*a*) is the same as FIG. 6(*b*), and FIG. 7(*b*) illustrates the mute screen 203.

A. The output unit 22 changes the source image display layer 210 to a predetermined screen (displayed entirely in black in the present embodiment). As a result, the image 202 transmitted from the terminal device 40 is made invisible to the user and surrounding people. The predetermined screen may be any screen that reduces the visibility of the image 202 transmitted from the terminal device 40, and may be, for example, a mosaic screen, full-screen white display, broadcast test color bars, a wallpaper, or the like. The predetermined screen may be a still image or a moving image.

B. The output unit 22 stops outputting the sound transmitted from the terminal device 40 from the display device 20. This prevents the user and surrounding people from listening to the sound from the terminal device 40. The sound from the terminal device 40 is stopped, and the sound generated on the display device 20 such as a tap sound (click sound) of the display device 20 is not stopped.

C. The operation reception unit 24 invalidates the touch operation on the image 202 transmitted from the terminal device 40.

Even in the case the touch control unit 26 detects a touch signal on the display panel 102 and sends the signal to the operation reception unit 24, the operation reception unit 24 discards the touch coordinates that overlaps the image 202 transmitted from the terminal device 40. On the other hand, the operation reception unit 24 does not invalidate the touch coordinates (receives the operation on the screen mute cancellation icon 16) in the case the touch coordinates included in a touch signal on the display panel 102 detected by the touch control unit 26 and sent to the operation reception unit 24 overlap with the screen mute cancellation icon 16, which is described below.

Also, even in the case the screen mute icon 15 is pressed, the communication unit 23 maintains the wireless communication with the terminal device 40. As a result, after recovery from the screen mute, the output unit 22 resumes outputting the image 202 and the sound from the terminal device 40 without delay.

Also, in response to pressing the screen mute icon 15, the display component control unit 21 displays the screen mute cancellation icon 16 alone on the icon layer 220. The screen mute cancellation icon 16 is an icon for notifying the user that the screen mute is in progress and that the screen mute can be cancelled by pressing the screen mute cancellation icon 16.

In response to the pressing of the screen mute icon 15, the communication unit 23 may further notify the terminal device 40 that the screen is being muted. In this case, although a dedicated application is to be provided on the terminal device 40, the terminal device 40 can stop transmission of the image and sound. In response to a pressing of the screen mute cancellation icon 16 and notification of the screen mute cancellation to the terminal device 40 by the communication unit 23, the terminal device 40 resumes the transmission of image and sound. During the screen mute, the terminal device 40 and the display device 20 reduces power consumption that was consumed in the wireless communication.

Alternatively, simply by pressing the screen mute icon 15, the communication unit 23 may instruct the wireless control unit 27 to disconnect the wireless communication with the terminal device 40. Although the terminal device 40 is not notified that the screen is muted, the terminal device 40 detects the disconnection of wireless communication. In this case, although the power consumption of the terminal device 40 can be reduced, the terminal device 40 may have to be operated to resume communication.

Figure 8:
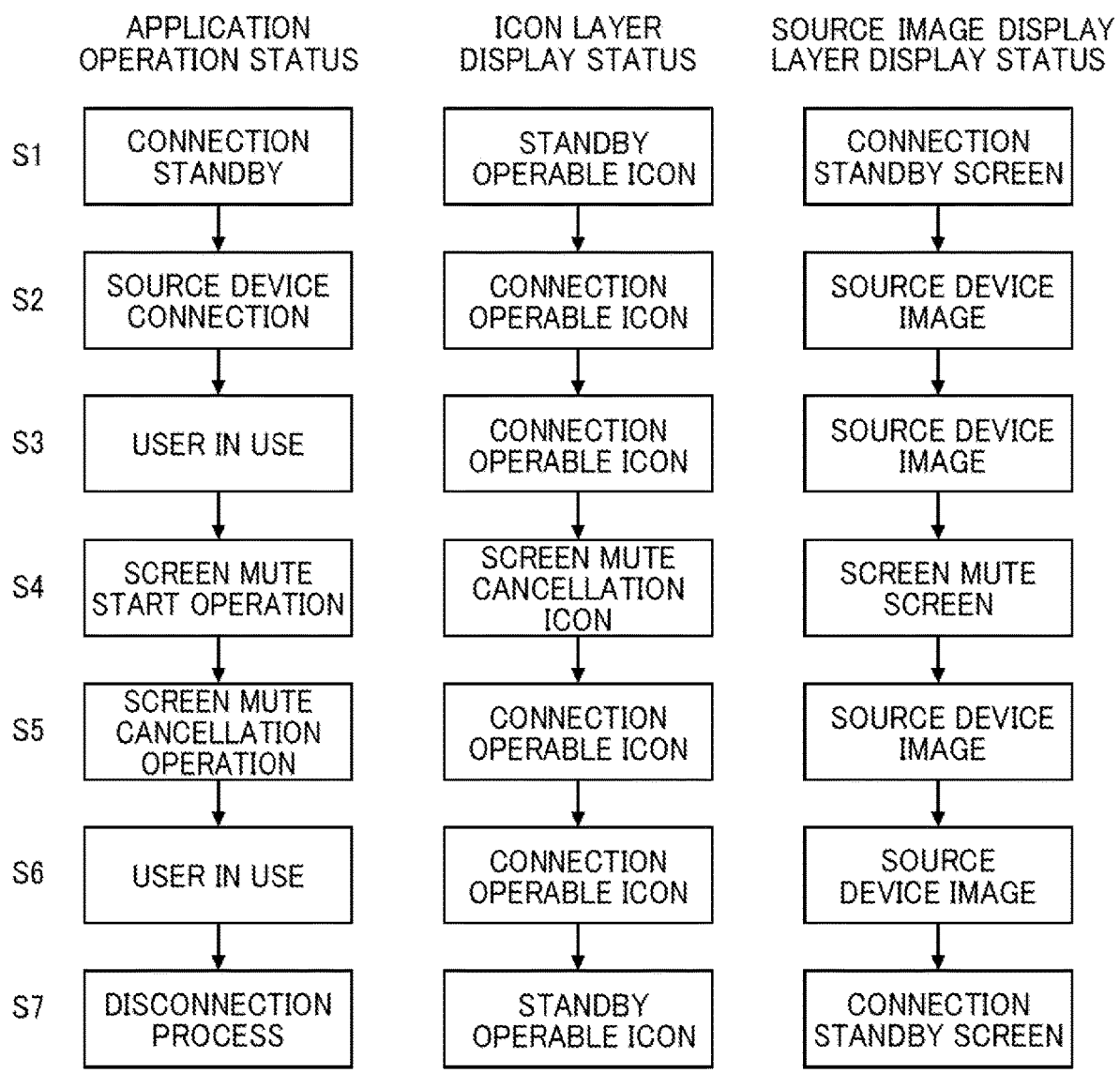
FIG. 8 is a diagram illustrating an example of an operation of the display device, transition of an icon layer and a source image display layer in chronological order.

With reference to FIG. 8, the status of the icon layer 220 and the source image display layer 210 are described in association with the operation of the display device 20. FIG. 8 is a diagram illustrating the operation of the display device 20 and transitions of the icon layer 220 and the source image display layer 210 in chronological order.

The icon layer 220 and the source image display layer 210 each have three display status. The icon layer 220 has the following three display status.

(i) Status in which the standby operable icon 33 is displayed. The standby operable icon 33 displays the icons of functions operable during the standby of wireless communication. As the standby operable icon 33, for example, the main body setting icon 13 for managing screen brightness, volume, wireless communication settings, and the like is displayed.

(ii) Status in which the connection operable icon 10 is displayed. The connection operable icon 10 is an icon that is operable during the wireless communication. In the present embodiment, the standby operable icon 33 is displayed together with the connection operable icon 10.

(iii) Status in which the screen mute cancellation icon 16 is displayed. The screen mute cancellation icon 16 is an icon displayed during the screen mute.

The source image display layer 210 has the following three display status.

(i) Status in which the connection standby screen 208 is displayed. The connection standby screen 208 is a screen that is displayed after the display device 20 is activated and before wireless communication is started. The connection standby screen 208 displays that the wireless communication is on standby, connection methods with the terminal device 40, and the like.

(ii) Status in which the source device image screen is displayed. The source device image screen is a screen that displays the image 202 displayed by the terminal device 40 during the wireless communication with the terminal device 40. The source device image screen is described below as the image 202 displayed by the terminal device 40 and the like.

(iii) Status in which the mute screen 203 is displayed. The mute screen 203 is a screen displayed during screen mute.

The display device 20 switches the status of the icon layer 220 and the source image display layer 210 to adapt to the operating status of the wireless connection application 31, as described below.

S1: While the communication unit 23 is on standby for wireless communication, the display component control unit 21 displays the standby operable icon 33 on the icon layer 220, and the output unit 22 displays the connection standby screen 208 on the source image display layer. 210.

As an example of a method for the terminal device 40 to start the wireless communication with the display device 20, the terminal device 40 may read a QUICK RESPONSE (QR) code (registered trademark) displayed by the display device 20. The QR code includes an internet protocol (IP) address and password of the display device 20, and enables the terminal device 40 to connect to the display device 20. The display device 20 may connect to the terminal device 40.

S2: In response to the communication unit 23 starting the wireless communication with the terminal device 40, the display component control unit 21 displays the connection operable icon 10 on the icon layer 220, and the output unit 22 displays the image 202 displayed on the terminal device 40 on the source image display layer 210.

S3: In the case the user is using the display device 20, the status is the same as in step S2. The user can operate the terminal device 40 from the display device 20 by touching the image 202 transmitted from the terminal device 40.

S4: The user presses the screen mute icon 15. The operation reception unit 24 receives a pressing of the screen mute icon 15. The display component control unit 21 displays the screen mute cancellation icon 16 on the icon layer 220, and the output unit 22 displays the mute screen 203 on the source image display layer 210. The operation reception unit 24 disables touch operations other than the screen mute cancellation icon 16.

As a result, in the case the user moves with the display device 20, the touch signal is not transmitted to the terminal device 40, preventing an erroneous operation and the risk of leaking the information of the image 202 while leaving the seat or moving is reduced. The communication unit 23 may cache the image while the mute screen 203 is displayed. In response to a cancellation of the screen mute, the output unit 22 displays the image immediately after stopping.

S5: The user presses the screen mute cancellation icon 16. The display component control unit 21 receives a pressing of the screen mute cancellation icon 16. The display component control unit 21 displays the connection operable icon 10 on the icon layer 220, and the output unit 22 displays on the source image display layer 210 the last image 202 received by the communication unit 23 while the mute screen 203 is displayed.

S6: In the case the user is using the display device 20, the status is the same as in step S2.

S7: The user disconnects the wireless communication (presses the disconnection icon 14). The display component control unit 21 receives pressing of the disconnection icon 14. The display component control unit 21 displays the standby operable icon 33 on the icon layer 220, and the output unit 22 displays the connection standby screen 208 on the source image display layer 210.

Figure 9:
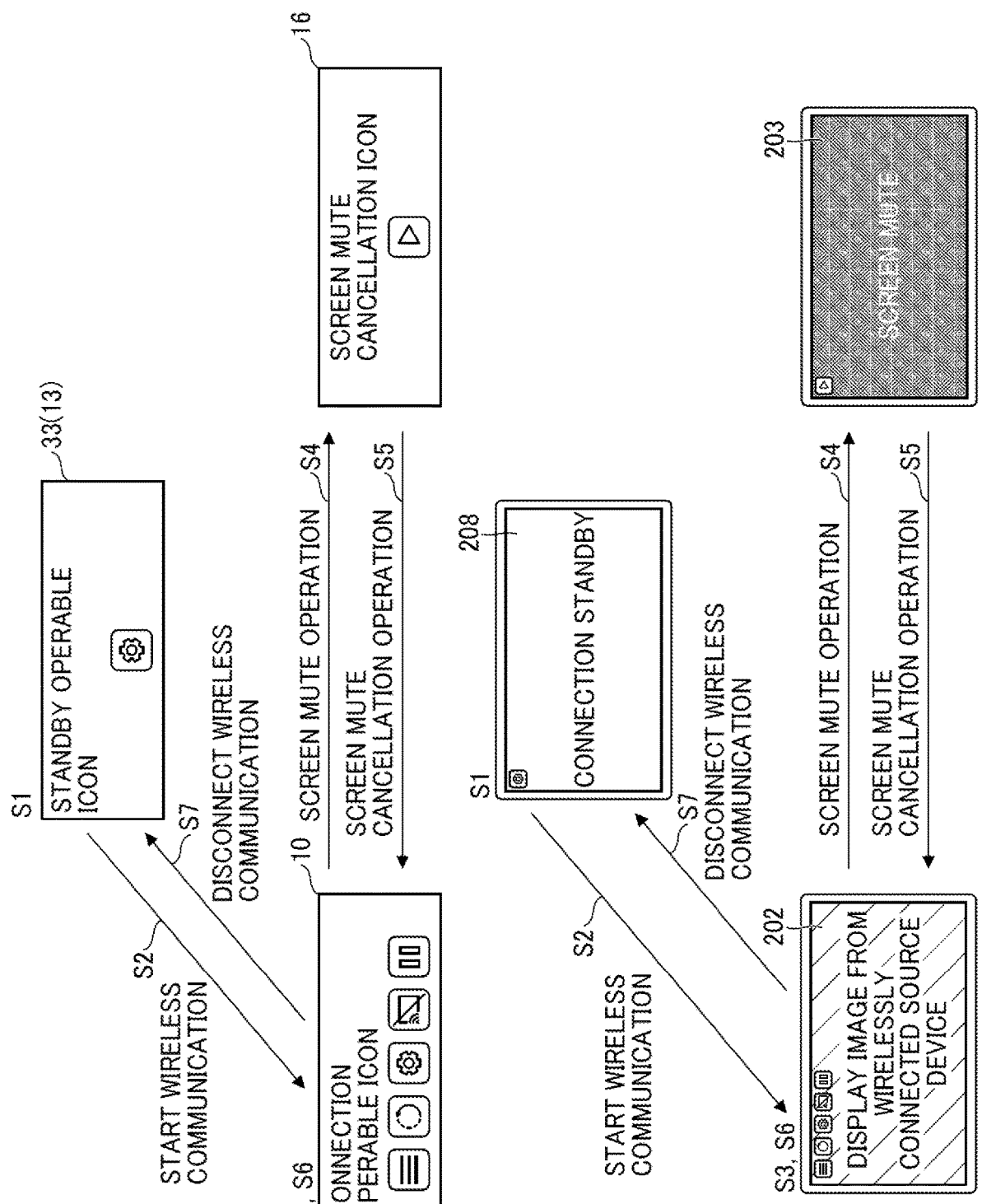
FIGS. 9A and 9B are diagrams illustrating an example of transition of display in FIG. 8.

FIGS. 9A and 9B are diagrams illustrating an example of display status transition in FIG. 8. The step numbers in FIGS. 9A and 9B generally correspond to the steps in FIG. 8. FIG. 9A illustrates the display status transition of the icon layer 220, and FIG. 9B illustrates the display status transition of the source image display layer 210. In both cases, the display status transitions under the transition conditions described with reference to FIG. 8.

Figure 10:
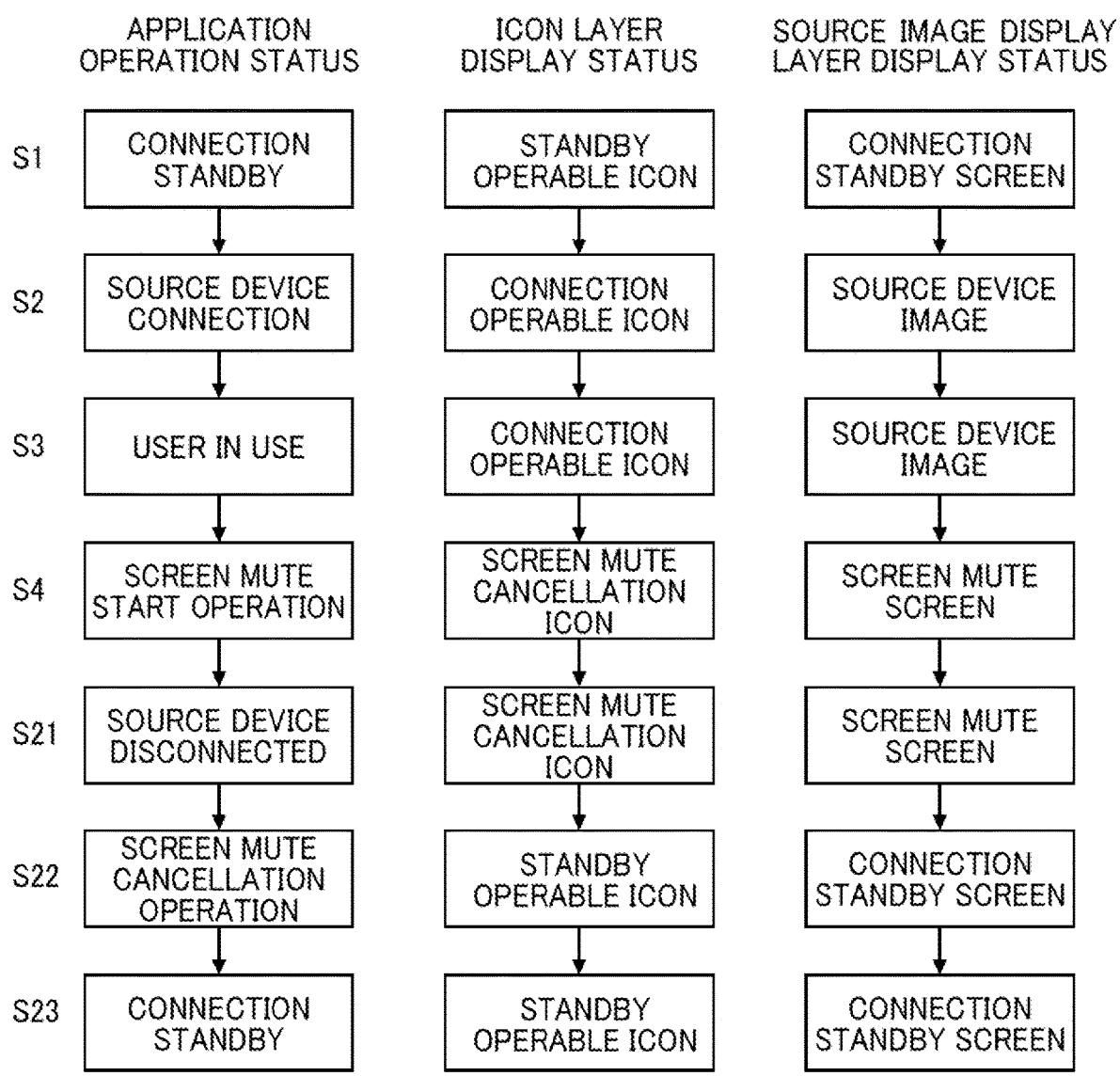
FIG. 10 is a diagram illustrating an example of transition of the operation of the display device, the icon layer, and the source image display layer in a case the wireless communication is disconnected during screen mute in chronological order.

With reference to FIG. 10, a display status in which the wireless communication is disconnected during the screen mute is described. FIG. 10 is a diagram illustrating, in chronological order, the operation of the display device 20, the transition of the icon layer 220, and the source image display layer 210 when the wireless communication is disconnected during the screen mute. The process of steps S1-S4 may be the same as in FIG. 8.

S21: The user disconnects the wireless communication by operating the terminal device 40 while the screen is muted. The reason for disconnection of the wireless communication does not matter. The wireless communication may be disconnected by at least one of the display device 20 or the terminal device 40 not being able to receive radio waves due to a decrease in radio wave intensity because of distance or interference.

In the case the wireless communication is disconnected, the display component control unit 21 continues to display the screen mute cancellation icon 16 on the icon layer 220, and the output unit 22 continues to display the mute screen 203 on the source image display layer 210. However, when the screen mute cancellation icon 16 is pressed while the wireless communication is connected, the image 202 from the terminal device is displayed.

In the case the wireless communication with the terminal device 40 is disconnected during the screen mute, the display device 20 continues to display the mute screen 203, preventing people in surroundings to notice that the connection is disconnected. As a result, a higher security protection effect is obtained.

S22: The user presses the screen mute cancellation icon 16. The display component control unit 21 receives a pressing of the screen mute cancellation icon 16. The display component control unit 21 displays the standby operable icon 33 on the icon layer 220, and the output unit 22 displays the connection standby screen 208 on the source image display layer 210.

S23: The display status during the connection standby may be the same as in step S1.

FIGS. 11A and 11B are diagrams illustrating an example of transition of display in FIG. 10. The step numbers in FIGS. 11A and 11B generally correspond to the steps in FIG. 10. FIG. 11A illustrates the display status transition of the icon layer 220, and FIG. 11B illustrates the display status transition of the source image display layer 210. In both cases, the display status transitions under the transition conditions described with reference to FIG. 10.

However, even in the case the wireless communication is disconnected while the mute screen 203 is displayed, the mute screen 203 is continuously displayed. Accordingly, the display status of the mute screen 203 includes status in which the wireless communication is in progress and status in which the wireless communication is disconnected. The mute screen 203 transitions as follows.

S21: As described with reference to FIG. 10, when the wireless communication is disconnected while the mute screen 203 is being displayed, the display of the screen mute cancellation icon 16 and the mute screen 203 continue.

In response to the pressing of the screen mute cancellation icon 16 while the wireless communication is connected, the display component control unit 21 turns the screen mute cancellation icon 16 off and displays the connection operable icon 10. Similarly, the output unit 22 switches the mute screen 203 to the image 202 transmitted from the terminal device 40 (S22).

In response to a pressing of the screen mute cancellation icon 16 after the wireless communication is disconnected, the display component control unit 21 turns the screen mute cancellation icon 16 off and displays the standby operable icon 33. Similarly, the output unit 22 switches the mute screen 203 to the connection standby screen 208 (S23).

Further, instead of a control method described in FIGS. 10, 11A and 11B, the display device 20 may cancel the screen mute immediately, in the case the wireless communication with the terminal device 40 is disconnected during the screen mute, considering the case where the user forgets to disconnect while the screen is muted.

FIGS. 12A and 12B are examples of display transition diagrams illustrating a case in which the screen mute is canceled in response to a disconnection of the wireless communication during the screen mute. In FIG. 12A, in response to a disconnection of the wireless communication during the screen mute (while the screen mute cancellation icon 16 is being displayed), the standby operable icon 33 is displayed (S21). In FIG. 12B, in response to a disconnection of the wireless communication during the screen mute (during the mute screen 203 being displayed), the connection standby screen 208 is displayed.

Further, as illustrated in FIG. 12A, when the wireless communication is not disconnected during the screen mute (while the screen mute cancellation icon 16 is being displayed) and the screen mute cancellation icon 16 is pressed, the connection operable icon 10 is displayed. (S22). As illustrated in FIG. 12B, when the wireless communication is not disconnected during screen mute (while the mute screen 203 is being displayed) and the screen mute cancellation icon 16 is pressed, an image 202 of the terminal device 40 is displayed.

Figure 13:
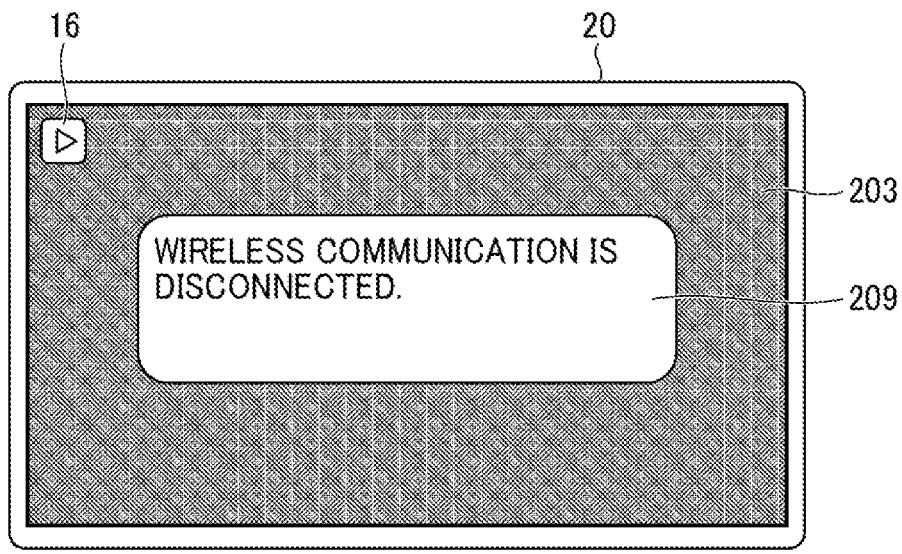
FIG. 13 is a diagram illustrating an example of an error message displayed on a mute screen.

As illustrated in FIG. 13, in response to the disconnection of the wireless communication during the screen mute, the output unit 22 may display an error message. FIG. 13 is a diagram illustrating an example of an error message 209 displayed on the mute screen 203 during the screen mute. In FIG. 13, the error message 209 stating "wireless communication is disconnected" is displayed. As a result, as in the processing of FIG. 10, even in the case the mute screen 203 remains displayed while the wireless communication is disconnected, the user can notice that the wireless communication is disconnected.

In this case, in step S21 of FIG. 10, the output unit 22 may continue to display the mute screen 203 and display the error message 209 overlaid on the source image display layer 210.

A single display device 20 can wirelessly communicate with a plurality of terminal devices 40 in parallel. In this case, the display device 20 divides the source image display layer 210 into a plurality of areas and displays a plurality of images respectively.

Figure 14:
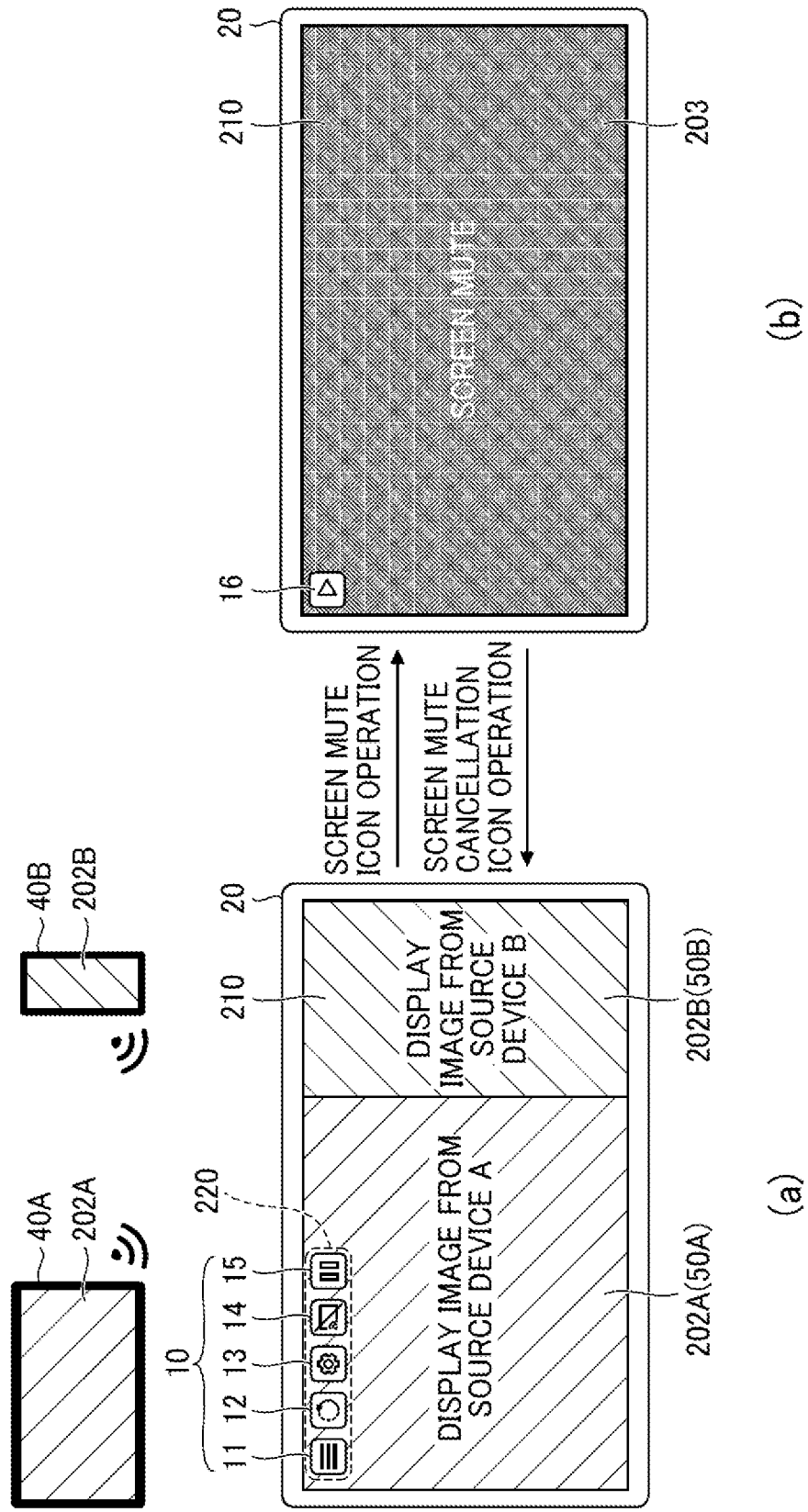
FIG. 14 is a diagram illustrating an example of a configuration of a source image display layer in which the display device displays multiple pieces of image at the same time.

FIG. 14 is a diagram illustrating an example of a configuration of a source image display layer 210 in which the display device 20 displays multiple pieces of image at the same time. As illustrated in FIG. 14(*a*), the display device 20 wirelessly communicates with two terminal devices 40A and 40B. The display device 20 displays an image 202A of the terminal device 40A in the left area 50A of the source image display layer 210, and displays an image 202B of the terminal device 40B in the right area 50B. The size of the two areas 50A and 50B and the image of which terminal device 40 is displayed in which area can be operated by the user. In addition, the connection operable icon 10 alone is displayed in the icon layer 220.

As illustrated in FIG. 14(*b*), even when the display device 20 displays a plurality of images by dividing the screen, in response to a pressing of the screen mute icon 15 by the user, the output unit 22 collectively displays the mute screen 203 on the source image display layer 210.

By implementing a function to collectively switch to the mute screen 203 for the images of a plurality of terminal devices 40, even in the case the user displays images from a plurality of terminal devices 40 on the display device 20, the output of the images and sounds can be stopped by one operation.

In the case the display device 20 is connected by the wireless communication with a plurality of terminal devices 40, a sound mute button is included in the connection operable icons 10. The sound mute button receives stopping of the sound output of at least one of the terminal devices 40A and 40B. The user can output the sound alone from the selected terminal device 40. In the case the sound mute button is not pressed, the display device 20 may output sound from the plurality of terminal devices 40 at the same time.

Figure 15:
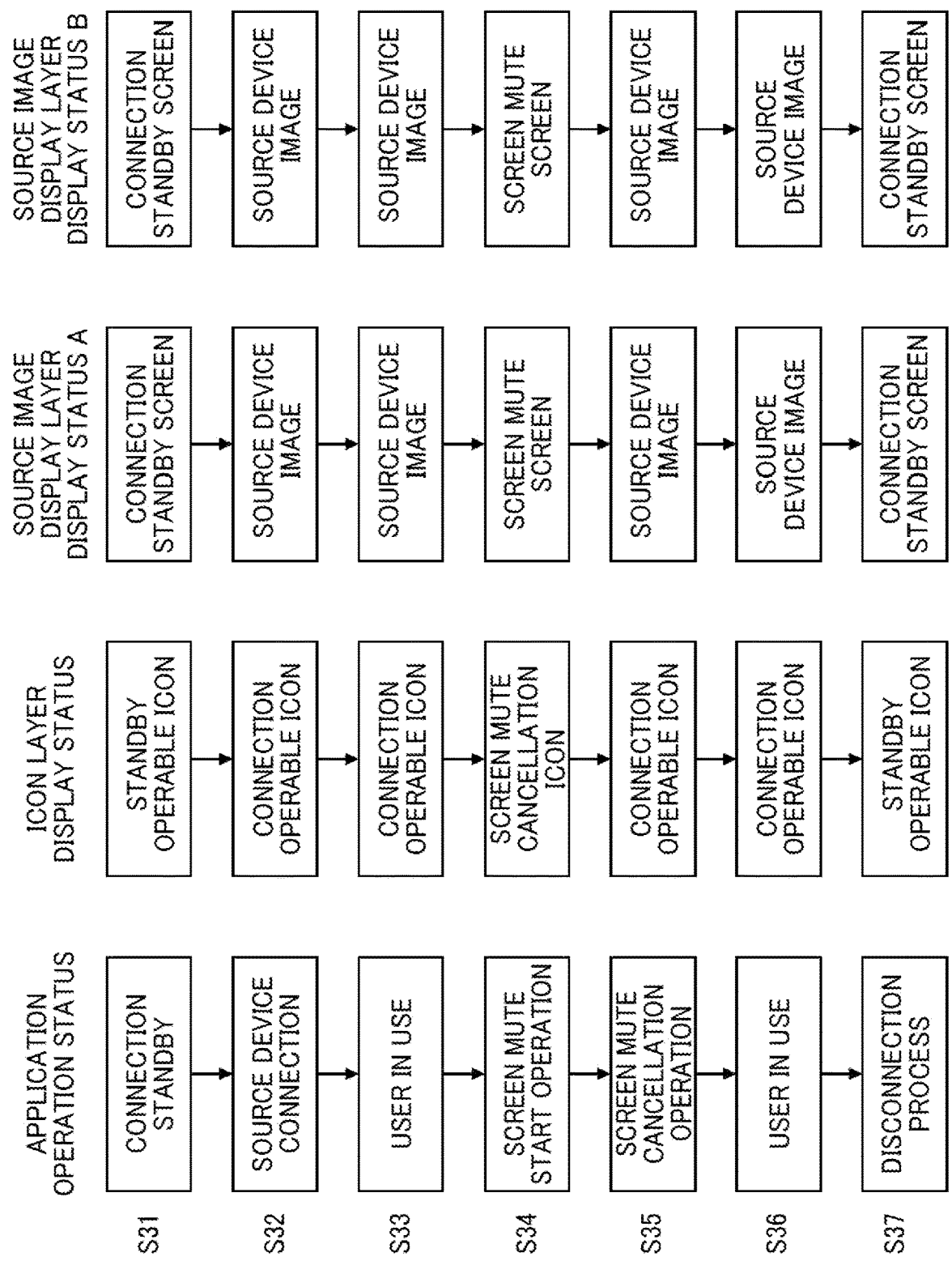
FIG. 15 is a diagram illustrating, in chronological order, the operation of the display device and the transition of the icon layer and the source image display layer in the case the display device wirelessly communicates with a plurality of terminal devices.

FIG. 15 is a diagram illustrating the operation of the display device 20 and transitions of the icon layer 220 and the source image display layer 210 in chronological order in the case the display device 20 is connected by the wireless communication with the plurality of terminal devices 40. The display status A of the source image display layer 210 is the display status of the area 50A, and the display status B of the source image display layer 210 is the display status of the area 50B.

As described with reference to FIG. 14, the areas 50A and 50B are switched to the mute screen 203 by a collective operation, processing in steps S31 to S37 is the same as in FIG. 8. FIG. 15 illustrates the display status B of the source image display layer 210 added to FIG. 8.

The number of images 202A and 202B transmitted from the terminal device 40 that can be displayed by the display device 20 is not limited to two, and three or more images may be displayed simultaneously.

Instead of switching a plurality of areas 50 to the mute screen 203 by a collective operation, the area 50 selected by the user may be switched to the mute screen 203.

Figure 16:
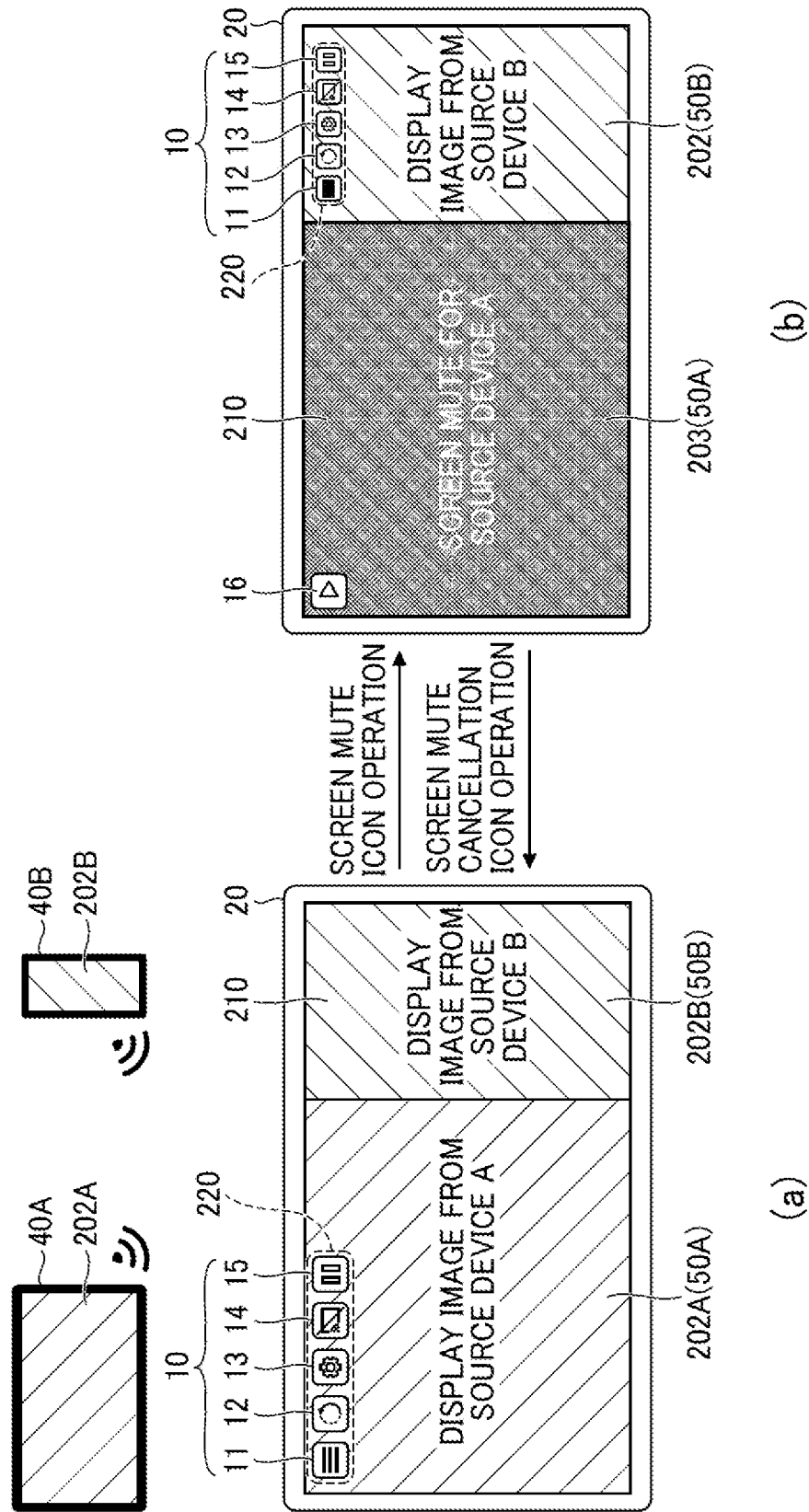
FIG. 16 is a diagram illustrating an example of a configuration of the source image display layer in which the display device displays multiple pieces of image at the same time.

FIG. 16 is a diagram illustrating an example of a configuration of the source image display layer 210 in which the display device 20 displays multiple pieces of image at the same time. FIG. 16(*a*) is the same as FIG. 14(*a*). As illustrated in FIG. 16(*b*), in response to a pressing of the screen mute icon 15 by the user, the output unit 22 switches the area 50A of the source image display layer 210 to the mute screen 203. Further, the display component control unit 21 switches the connection operable icon 10 in the area 50A to the screen mute cancellation icon 16, and newly displays the connection operable icon 10 in the area 50B. This is to enable the screen mute of the area 50B.

In this case, the user presses the screen mute icon 15 after selecting the area 50A or 50B for switching to the mute screen 203 in advance. The area selected by the user indicates that the area is selected by highlighting an outer edge. Accordingly, the user can select an image to hide.

Alternatively, the area 50 to mute may be selected after pressing the screen mute icon 15. In response to pressing of the screen mute icon 15, the user is prompted to touch the area 50A or 50B, and the user selects the area 50A to switch to the mute screen 203. Alternatively, in response to the pressing of the screen mute icon 15, thumbnails of the areas 50A and 50B are displayed, and the user may select an area to switch to the mute screen 203.

Figure 17:
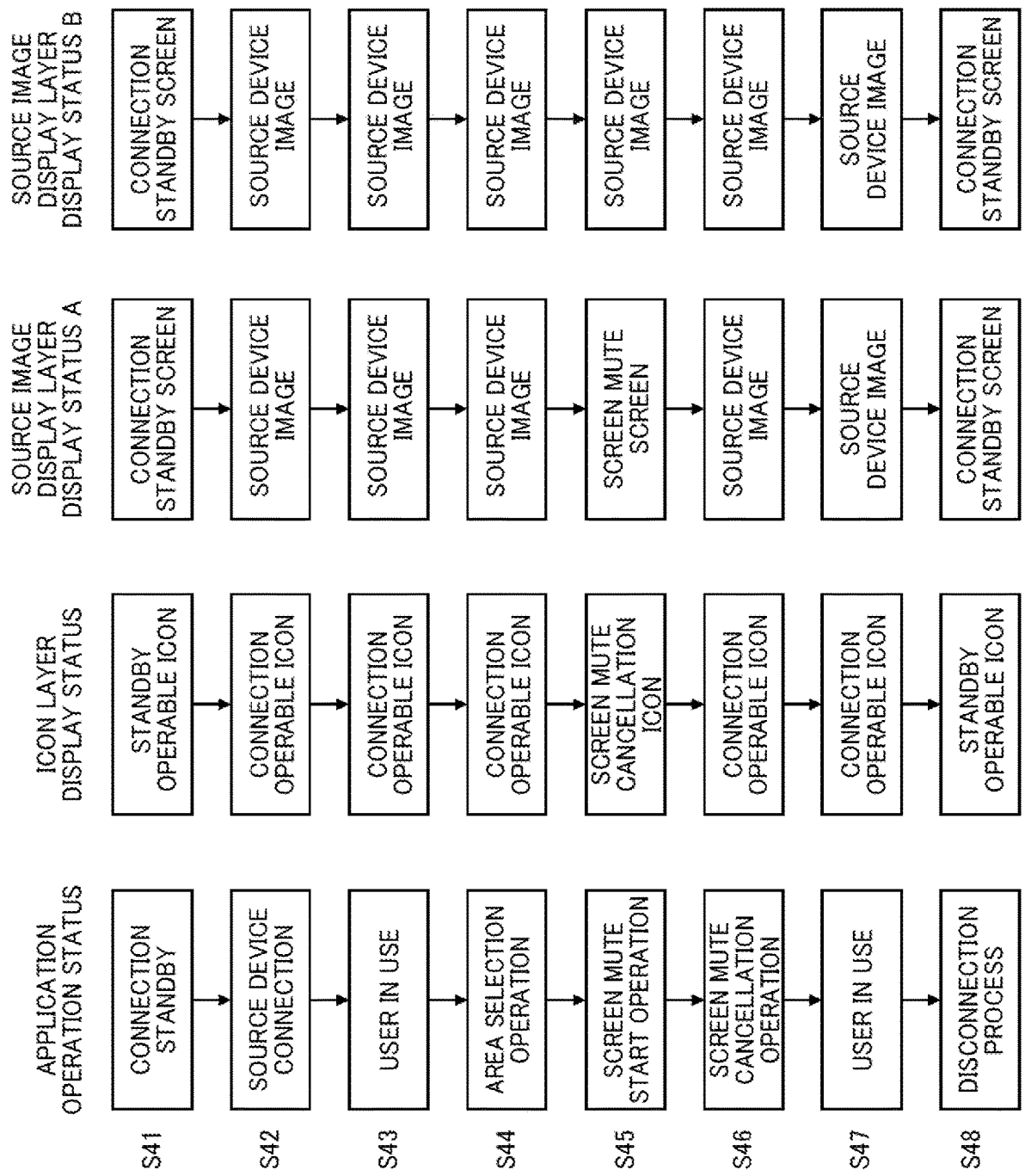
FIG. 17 is a diagram illustrating, in chronological order, the operation of the display device and the transition of the icon layer and the source image display layer in the case the display device wirelessly communicates with the plurality of terminal devices.

FIG. 17 is a diagram illustrating the operation of the display device 20 and transitions of the icon layer 220 and the source image display layer 210 in chronological order in the case the display device 20 is connected by the wireless communication with the plurality of terminal devices 40. The display status A of the source image display layer 210 is the display status of the area 50A, and the display status B of the source image display layer 210 is the display status of the area 50B. Steps S41 to S43 may be the same as in FIG. 15.

S44: The user selects an area to switch to the mute screen 203. The operation reception unit 24 receives the selection. In this example, the area 50A is selected. The display status A and B of the icon layer 220 and the source image display layer 210 remain the same as step S43.

S45: The user presses the screen mute icon 15. The operation reception unit 24 receives a pressing of the screen mute icon 15. The display component control unit 21 displays the screen mute cancellation icon 16 in the area 50A of the icon layer 220, and displays the connection operable icon 10 in the area 50B of the icon layer 220. The output unit 22 displays the mute screen 203 in the area 50A of the source image display layer 210 and continues to display the image of the terminal device 40 in the area 50B of the source image display layer 210.

S46: The user presses the screen mute cancellation icon 16. The operation reception unit 24 receives pressing of the screen mute cancellation icon 16. The display component control unit 21 deletes the screen mute cancellation icon 16 in the area 50A, deletes the connection operable icon 10 in the area 50B, and displays the connection operable icon 10 in the area 50A of the icon layer 220. The output unit 22 displays the image 202A displayed by the terminal device 40 in the area 50A of the source image display layer 210, and continues to display the image 202B displayed by the terminal device 40 in the area 50B.

S47: In the case the user is using the display device 20, the process is the same with step S43 (step S3 in FIG. 8).

S48: The user disconnects the wireless communication (presses the disconnection icon 14). The operation reception unit 24 receives a pressing of the disconnection icon 14. The display component control unit 21 displays the standby operable icon 33 on the icon layer 220. The output unit 22 displays the connection standby screen 208 on the source image display layer 210. The source image display layer 210 is not divided into multiple areas 50A, and 50B before the wireless communication is connected.

The display component control unit 21 may display the connection operable icon 10 for each of the areas 50A and 50B so that the user does not have to select the area 50A for switching to the mute screen 203.

Figure 18:
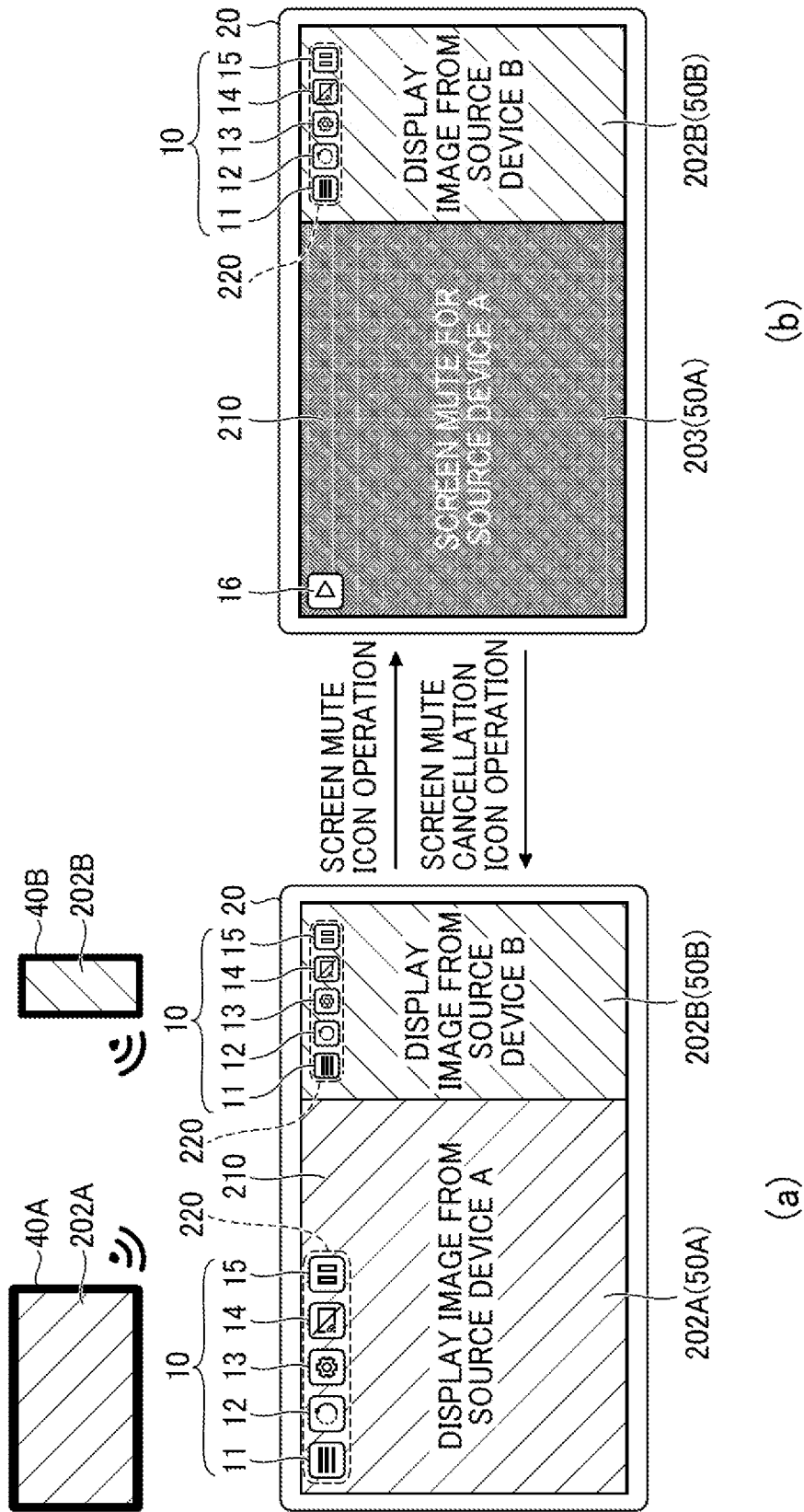
FIG. 18 is a diagram illustrating an example of a configuration of the source image display layer in which the display device displays multiple pieces of image at the same time.

FIG. 18 is a diagram illustrating an example of a configuration of the source image display layer 210 in which the display device 20 displays multiple pieces of image at the same time. In FIG. 18(a), the connection operable icon 10 is displayed in each of the areas 50A and 50B. FIG. 18(b) may be the same with FIG. 16(b). In FIG. 18(a), in the case the user wishes to switch the area 50A to the mute screen 203, the user operates the connection operable icon 10 in the area 50A and the area 50A is switched to the mute screen 203 without selecting the area 50A by tapping or the like.

In the present embodiment, the display device 20 includes a touch panel, but the display device 20 may not include the touch panel.

Figure 19:
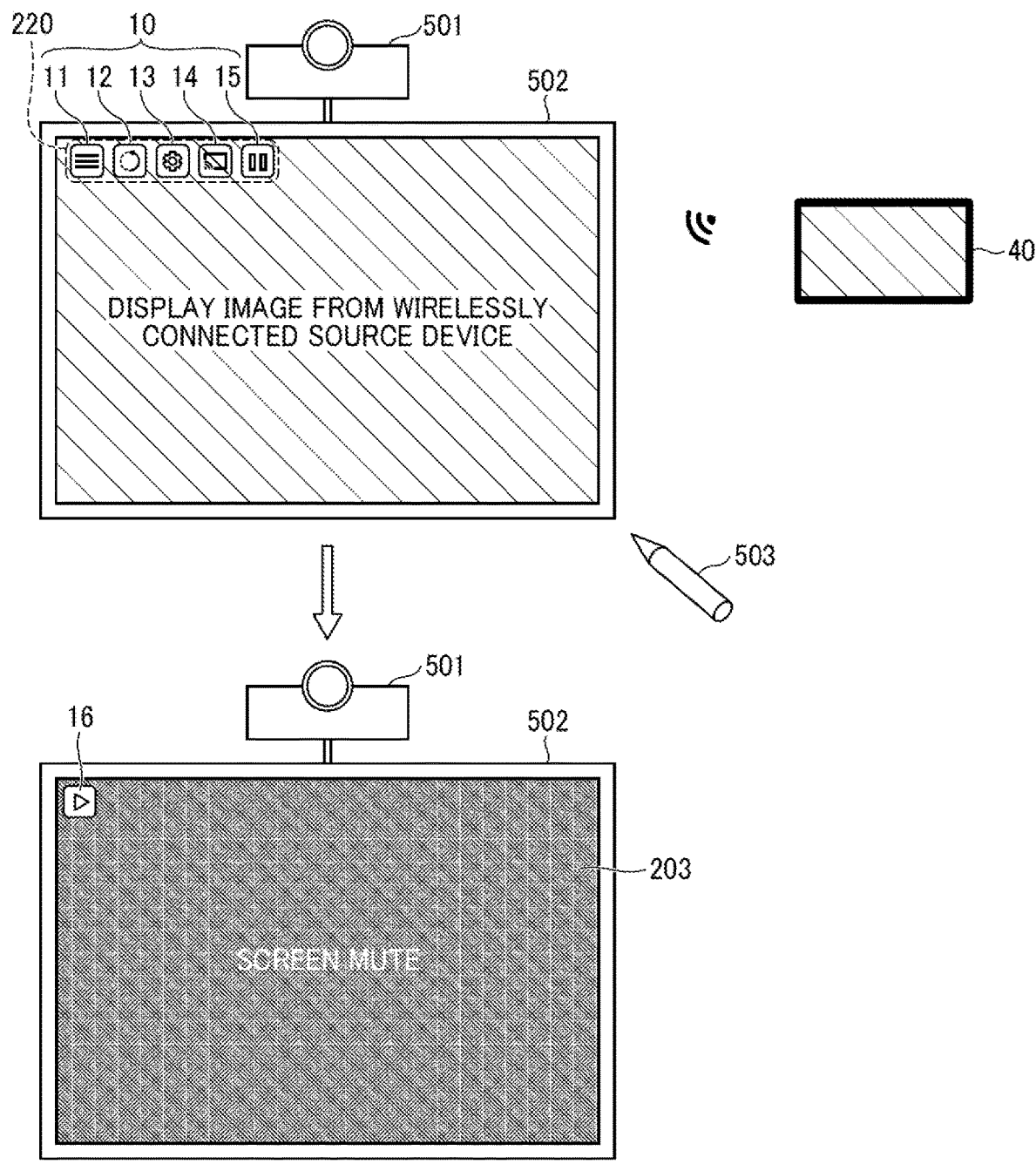
FIG. 19 is a block diagram illustrating another example of the functional configuration of the display device.

FIG. 19 is a block diagram illustrating another example of the functional configuration of the display device 20. In FIG. 19, a projector 501 is installed on the upper side of an ordinary whiteboard 502. The projector 501 corresponds to the display device 20. The ordinary whiteboard 502 is not a flat panel display integrated with a touch panel, but a whiteboard on which a user directly writes with a marker. The whiteboard may be a blackboard, and may be a flat surface that is large enough to project an image.

The projector 501 includes an ultra-short focal length optical system, and projects an image with little distortion on the whiteboard 502 from about 10 cm. The image is transmitted from the terminal device 40 connected wirelessly or by wire.

The user writes on the whiteboard 502 by hand using a dedicated electronic pen 503. The electronic pen 503 includes a light emitting component, for example, at the tip, which is turned on in response to the user pressing the electronic pen 503 against the whiteboard 502 for handwriting. The wavelength of light is in the near-infrared or infrared, that is invisible to the user's eyes. The projector 501 includes a camera that captures an image of the light emitting component, analyzes the image, and identifies the direction of the electronic pen 503. The electronic pen 503 emits sound wave together with the light and the projector 501 calculates a distance based on arrival time of the sound wave. The projector 501 specifies a position of the electronic pen 503 based on the distance and direction. Handwritten data is drawn (projected) based on the position of the electronic pen 503.

The projector 501 projects the connection operable icon 10, and in response to the user pressing the screen mute icon 15 with the electronic pen 503, the projector 501 identifies the pressed screen mute icon 15 based on the position of the electronic pen 503 and the on signal of the switch.

Similar to the case where the display device 20 includes a display, the projector 501 switches to the mute screen 203 and display the screen mute cancellation icon 16.

Although the best mode for carrying out the present disclosure has been described using the examples described above, the present disclosure is not limited to these examples, and various modifications and substitutions can be made without departing from the scope of the present disclosure.

For example, in the present embodiment, the screen mute icon 15 and the screen mute cancellation icon 16 are soft keys displayed on the touch panel. However, functions similar to these keys may be implemented by the hard keys. The display device 20 is assumed to include predetermined hard keys. The hard key implements the same function as the screen mute icon 15 when pressed for the first time, and implements the same function as the screen mute cancellation icon 16 when pressed for the second time. The screen mute icon 15 and the screen mute cancellation icon 16 may or may not be displayed on the display panel 102 even in the case the hard key operation is possible.

Further, in the present embodiment, the output of image and sound is stopped by pressing the screen mute icon 15, but the output of the image alone may be stopped, or the output of the sound alone may be stopped.

Further, in the present embodiment, the display device 20 is of a portable type, but the display device 20 may be of a stationary type. Each user can display the image of his or her own terminal device 40 on a large display device 20 in a conference room or the like. Examples of the large display device 20 include an electronic whiteboard, digital signage, and the like.

The terminal device 40 and the display device 20 may be of the same model. For example, in the case the terminal device 40 and the display device 20 are electronic blackboards, a teleconference may be held by sharing the screens of the terminal device 40 and the display device 20, and screen mute operation on one of the terminal device 40 or the display device 20 switches the terminal device 40 and the display device 20 into the screen mute.

Further, the display device 20 may display the elapsed time since the mute screen 203 was displayed while the mute screen 203 is being displayed. Further, the display device 20 may change the mute screen 203 over time. The user may be prompted to return to the image 202. For example, the display device 20 may change the mute screen 203 to a full-screen black display, full-screen red display, full-screen blue display, or full-screen white display. The user can get an approximate elapsed time.

Further, the communication unit 23 may disconnect the wireless communication after a certain period of time has elapsed since the mute screen 203 is displayed. Power consumption can be reduced in the case the user concentrates on another task while the mute screen 203 is displayed. In this case, the mute screen 203 may remain as the mute screen 203 or may transition to the connection standby screen 208.

Further, the example of configuration illustrated in FIG. 4 and the like are divided according to main functions in order to facilitate understanding of processing by the display device 20. The present disclosure is not limited by the method and name of division of processing units. The processing of the display device 20 can also be divided into more processing units according to the processing content. Further, one process may be divided to include a larger number of processes.

Embodiments of the present disclosure provide significant improvements in computer power and functionality. These improvements allow the users to take advantage of computers that provide more efficient and robust interaction with tables, which is the way information is stored and presented on information processing apparatuses. Additionally, embodiments of the present disclosure provide a better user experience through the use of a more efficient, powerful and robust user interface. Such user interfaces provide better interaction between humans and machines.

Aspects of the present disclosure are, for example, as follows.

According to a first aspect, a display device to display an image received from a terminal device and to transmit operation information on the image to the terminal device includes a communication unit to receive the image from the terminal device by wireless communication, an output unit to output the image received by the communication unit to a display, an operation reception unit to acquire the operation information on the image, and a display component control unit to display the first display component together with the image, the first display component for receiving an operation to execute a process of stopping the output of the image and a process of restricting transmission of the acquired operation information to the terminal device.

According to a second aspect, in the display device of the first aspect, the operation information on the image is operation position information acquired based on an operation on the display of the display device.

According to a third aspect, in the display device of the first aspect, the display component control unit avoids displaying the first display component in a case the image is not being output, displays the first display component in response to a start of an output of the image by the output unit, and deletes the first display component in response to an end of the output of the image.

According to a fourth aspect, in the display device of the first aspect or the second aspect, in response to an acquisition of the operation position information on the first display component by the operation reception unit, the output unit stops outputting the image, the display component control unit deletes the first display component and displays a second display component for resuming output of the image, and the operation reception unit restricts transmission of the operation position information to the terminal device other than the operation position information of the second display component.

According to a fifth aspect, in the display device of the third aspect, in a case the output unit stopped the output of the image, the communication unit continues to receive the image from the terminal device by wireless communication, and in response to an acquisition of the operation position information on the second display component by the operation reception unit, the output unit outputs the image that has been received.

According to a sixth aspect, in the display device of the third aspect, the output unit displays a predetermined screen in a case the image is not being output, and in response to a disconnection of the wireless communication with the terminal device while the redetermined screen is being displayed and the transmission of the operation position information to the terminal device is restricted for display components other than the second display component, the output unit continues to display the predetermined screen.

According to a seventh aspect, in the display device of the fifth aspect, in a case the wireless communication with the terminal device is disconnected, in response to an acquisition of the operation position information on the second display component by the operation reception unit, the output unit displays a screen to indicate a standby for connection by wireless communication with the terminal device.

According to an eighth aspect, in the display device of the fifth aspect or the sixth aspect, the output unit displays a message to indicate that the wireless communication is disconnected together with the display of the predetermined screen.

According to a ninth aspect, in the display device of the third aspect, the output unit displays a predetermined screen in the case the image is not being output, and in response to a disconnection of the wireless communication with the terminal device, while the predetermined screen is being displayed and the transmission of the operation position information to the terminal device is restricted for display components other than the second display component, the output unit displays a screen to indicate a standby for connection by wireless communication with the terminal device.

According to a tenth aspect, in the display device of any one of the first aspect to the eighth aspect, the communication unit receives images from a plurality of terminal devices by the wireless communication, and in response to an acquisition of the operation position information on the second display component by the operation reception unit while the output unit outputs a plurality of images, the output unit stops output of the plurality of images.

According to an eleventh aspect, in the display device of any one of the first aspect to the eighth aspect, the communication unit receives images from the plurality of terminal devices by the wireless communication, and in response to the acquisition of the operation position information on the second display component by the operation reception unit while the output unit outputs the plurality of images, the output unit stops the output of the image for which a selection is received by the operation reception unit.

According to a twelfth aspect, in the display device of the tenth aspect, in addition to stopping the output of the image, the output unit deletes the first display component related to the image whose output is stopped and displays the first display component related to the image whose output is not stopped.

According to a thirteenth aspect, in the display device of any one of the third aspect to the eleventh aspect, the communication unit receives sound from the terminal device by the wireless communication, and in response to an acquisition of the operation position information on the first display component by the operation reception unit, the output unit stops the output of the image and the sound.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A display device comprising circuitry configured to:
   receive an image from a terminal device by wireless communication;
   output the image to a display;
   acquire operation information on the image being displayed at the display, the operation information on the image being operation position information acquired based on an operation on the display of the display device; and
   display a first display component together with the image, the first display component for receiving an operation that executes to stop the output of the image and restrict transmission of the operation information to the terminal device,
   wherein, in response to an acquisition of the operation position information on the first display component, the circuitry is configured to:
   stop the output of the image to the display;
   delete the first display component from the display;
   display a second display component for resuming the output of the image to the display; and
   restrict transmission of the operation position information to the terminal device other than the operation position information on the second display component, and
   wherein, in a case where the output of the image is stopped, the circuitry is further configured to:
   continue to receive the image from the terminal device by the wireless communication; and
   in response to an acquisition of the operation position information on the second display component, output the image that has been received.

2. The display device of claim 1, wherein
   the circuitry is configured to:
   avoid displaying the first display component in a case where the image is not being output;
   in response to a start of output of the image, display the first display component on a screen of the display; and
   in response to an end of the output of the image, delete the first display component from the screen of the display.

3. The display device of claim 1, wherein
   the circuitry is further configured to:
   display a predetermined screen in a case where the image is not being output; and
   in response to a disconnection of the wireless communication with the terminal device while the predetermined screen is being displayed and the transmission of the operation position information to the terminal device is restricted for display components other than the second display component, display a screen indicating that the connection with the terminal device by the wireless communication is made standby.

4. The display device of claim 1, wherein
   in a case where a plurality of images including the image are received from a plurality of terminal devices including the terminal device by the wireless communication, and in response to an acquisition of the operation position information on the first display component while the plurality of images are being output to the display, the circuitry is further configured to stop the output of one or more of the plurality of images for which a selection is received to the display.

5. The display device of claim 2, wherein
   the circuitry is further configured to:
   receive sound from the terminal device by the wireless communication; and
   in response to an acquisition of the operation position information on the first display component, stop the output of the image and the sound.

6. A display device of comprising circuitry configured to:
   receive an image from a terminal device by wireless communication:
   output the image to a display:
   acquire operation information on the image being displayed at the display, the operation information on the image being operation position information acquired based on an operation on the display of the display device; and
   display a first display component together with the image, the first display component for receiving an operation that executes to stop the output of the image and restrict transmission of the operation information to the terminal device,
   wherein, in response to an acquisition of the operation position information on the first display component, the circuitry is configured to:
   stop the output of the image to the display:
   delete the first display component from the display;
   display a second display component for resuming the output of the image to the display; and
   restrict transmission of the operation position information to the terminal device other than the operation position information on the second display component
   wherein the circuitry is further configured to:
   display a predetermined screen on the display in a case where the output of the image is stopped; and
   in response to a disconnection of the wireless communication with the terminal device while the predetermined screen is being displayed and the transmission of the operation position information to the terminal device is restricted for display components other than the second display component, continue to display the predetermined screen on the display.

7. The display device of claim 6, wherein
   in response to an acquisition of the operation position information on the second display component while the wireless communication with the terminal device is disconnected, the circuitry is further configured to display on the display, a screen indicating that connection with the terminal device by the wireless communication is made standby.

8. The display device of claim 6, wherein
the circuitry is further configured to display on the display, a message indicating that the wireless communication is disconnected with the display of the predetermined screen.

9. The display device of claim 6, wherein
the circuitry is configured to:
avoid displaying the first display component in a case where the image is not being output;
in response to a start of output of the image, display the first display component on a screen of the display; and
in response to an end of the output of the image, delete the first display component from the screen of the display.

10. The display device of claim 9, wherein
the circuitry is further configured to:
receive sound from the terminal device by the wireless communication; and
in response to an acquisition of the operation position information on the first display component, stop the output of the image and the sound.

11. The display device of claim 6, wherein
in a case where a plurality of images including the image are received from a plurality of terminal devices including the terminal device by the wireless communication, and in response to an acquisition of the operation position information on the first display component while the plurality of images are being output to the display, the circuitry is configured to stop the output of one or more of the plurality of images to the display.

12. The display device of claim 11, wherein
in addition to the stop of the output of the one or more images, the circuitry is further configured to:
delete the first display component for the one or more images whose output is stopped; and
display the first display component for the other one or more images whose output is not stopped.

13. A display device comprising circuitry configured to:
receive an image from a terminal device by wireless communication;
output the image to a display:
acquire operation information on the image being displayed at the display; and
display a first display component together with the image, the first display component for receiving an operation that executes to stop the output of the image and restrict transmission of the operation information to the terminal device,
wherein in a case where a plurality of images including the image are received from a plurality of terminal devices including the terminal device by the wireless communication, and in response to an acquisition of the operation position information on the first display component while the plurality of images are being output to the display, the circuitry is configured to stop the output of one or more of the plurality of images to the display.

14. The display device of claim 13, wherein
in addition to the stop of the output of the one or more images, the circuitry is further configured to:
delete the first display component for the one or more images whose output is stopped; and
display the first display component for the other one or more images whose output is not stopped.

15. A display control method comprising:
receiving an image from a terminal device by wireless communication;
outputting the image to a display of a display device;
acquiring operation information on the image being displayed, the operation information on the image being operation position information acquired based on an operation on the display of the display device; and
displaying a first display component together with the image, the first display component for receiving an operation that executes to stop the output of the image and to restrict transmission of the operation information to the terminal device,
wherein, in response to an acquisition of the operation position information on the first display component,
the output of the image to the display is stopped,
the first display component is deleted from the display,
a second display component for resuming the output of the image to the display is displayed, and
transmission of the operation position information to the terminal device other than the operation position information on the second display component is restricted, and
wherein, in a case where the output of the image is stopped, the image from the terminal device by the wireless communication is continued to receive, and
in response to an acquisition of the operation position information on the second display component, the image that has been received is outputted.

16. A non-transitory recording medium which, when executed by one or more processors on an information processing apparatus, cause the one or more processors to perform the display control method of claim 15.

17. A display system comprising:
a wireless communication device; and
a display device,
the wireless communication device including circuitry configured to:
receive an image from a terminal device by wireless communication;
output the image to the display device;
acquire operation information on the image being displayed at the display device, the operation information on the image being operation position information acquired based on an operation on the display device; and
display a first display component together with the image, the first display component for receiving an operation that executes to stop the output of the image and to restrict transmission of the operation information to the terminal device, and
the display device including a display to display the image output from the wireless communication device,
wherein, in response to an acquisition of the operation position information on the first display component, the circuitry is configured to:
stop the output of the image to the display:
delete the first display component from the screen of the display:
display a second display component for resuming the output of the image to the display; and
restrict transmission of the operation position information to the terminal device other than the operation position information on the second display component, and
wherein, in a case where the output of the image is stopped, the circuitry is further configured to:
continue to receive the image from the terminal device by the wireless communication; and in response to an acquisition of the operation position information on the second display component, output the image that has been received.

* * * * *